June 16, 1959 F. H. OWENS 2,890,635
ROLL FILM CAMERA
Original Filed Jan. 22, 1946 6 Sheets-Sheet 1
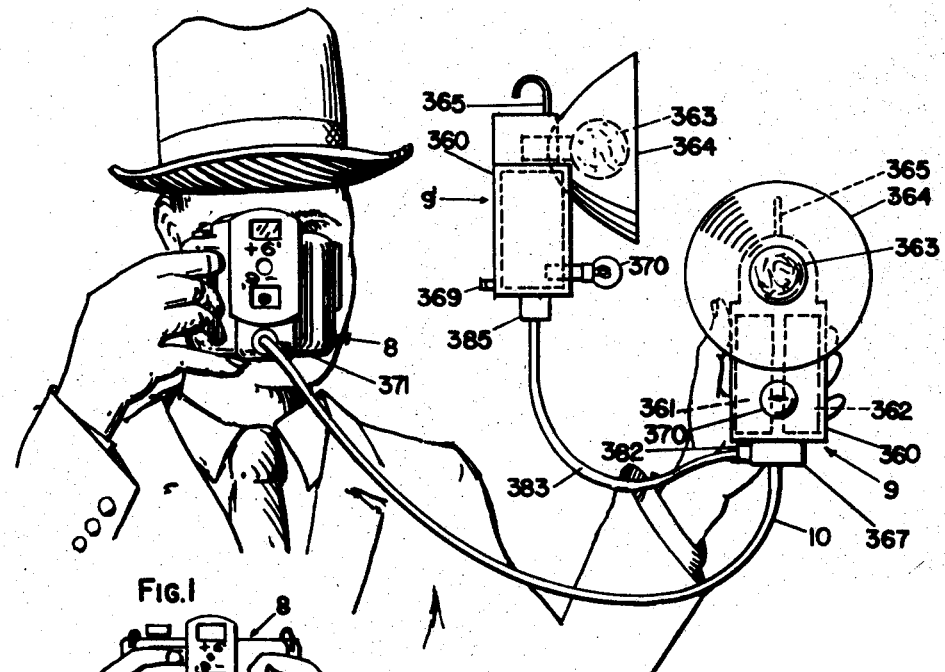
FIG. 1
FIG. 1a
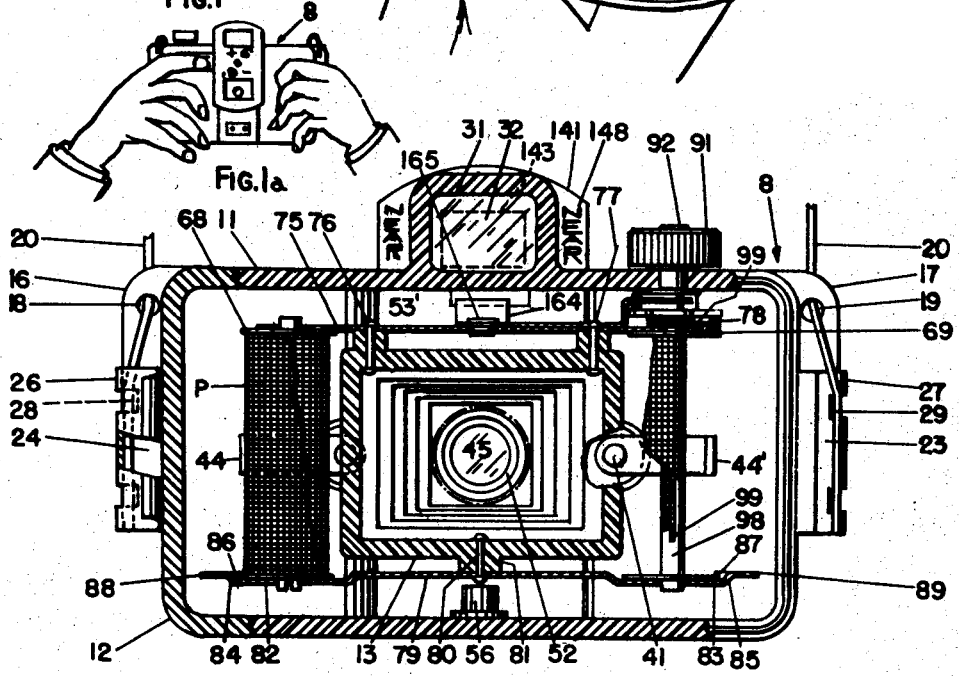
FIG. 2
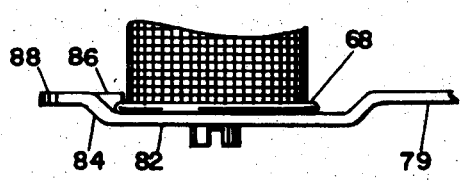
FIG. 2a
INVENTOR.
FREEMAN H. OWENS
BY
Attorney June 16, 1959 F. H. OWENS 2,890,635
ROLL FILM CAMERA
Original Filed Jan. 22, 1946 6 Sheets-Sheet 2

INVENTOR.
FREEMAN H. OWENS
BY
ATTORNEY

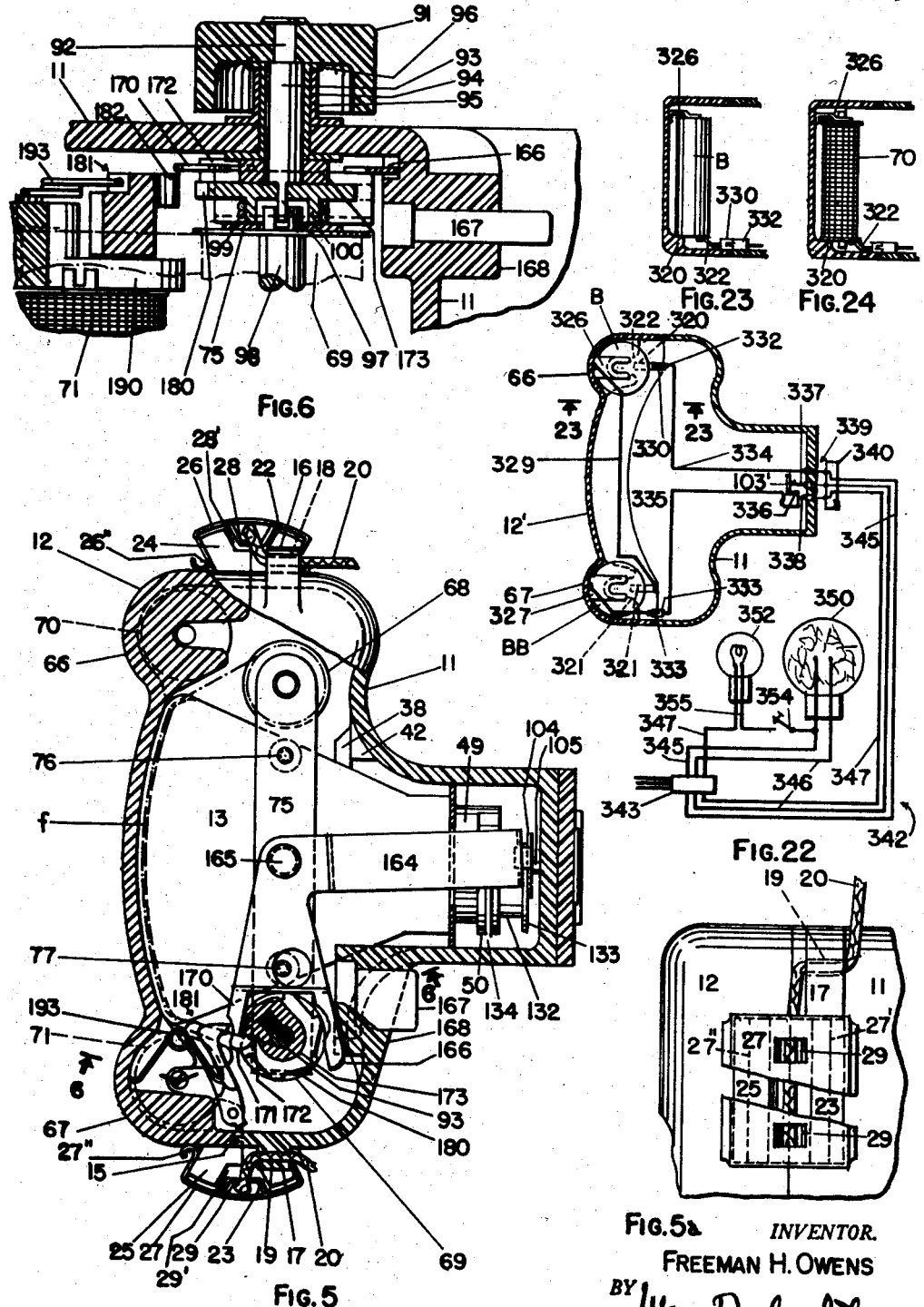

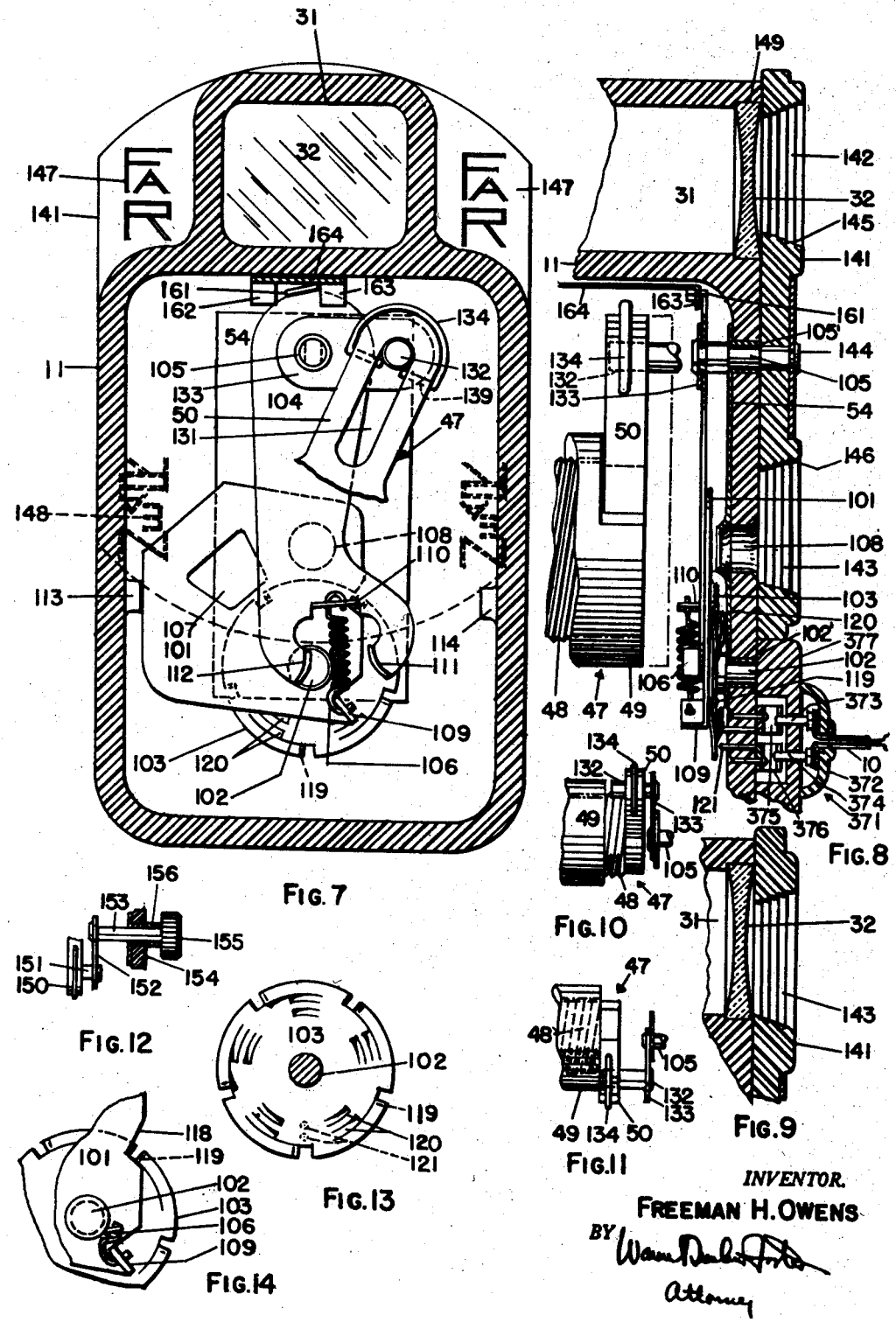

June 16, 1959     F. H. OWENS     2,890,635
ROLL FILM CAMERA

Original Filed Jan. 22, 1946     6 Sheets-Sheet 5

*INVENTOR.*
FREEMAN H. OWENS
BY
*Attorney*

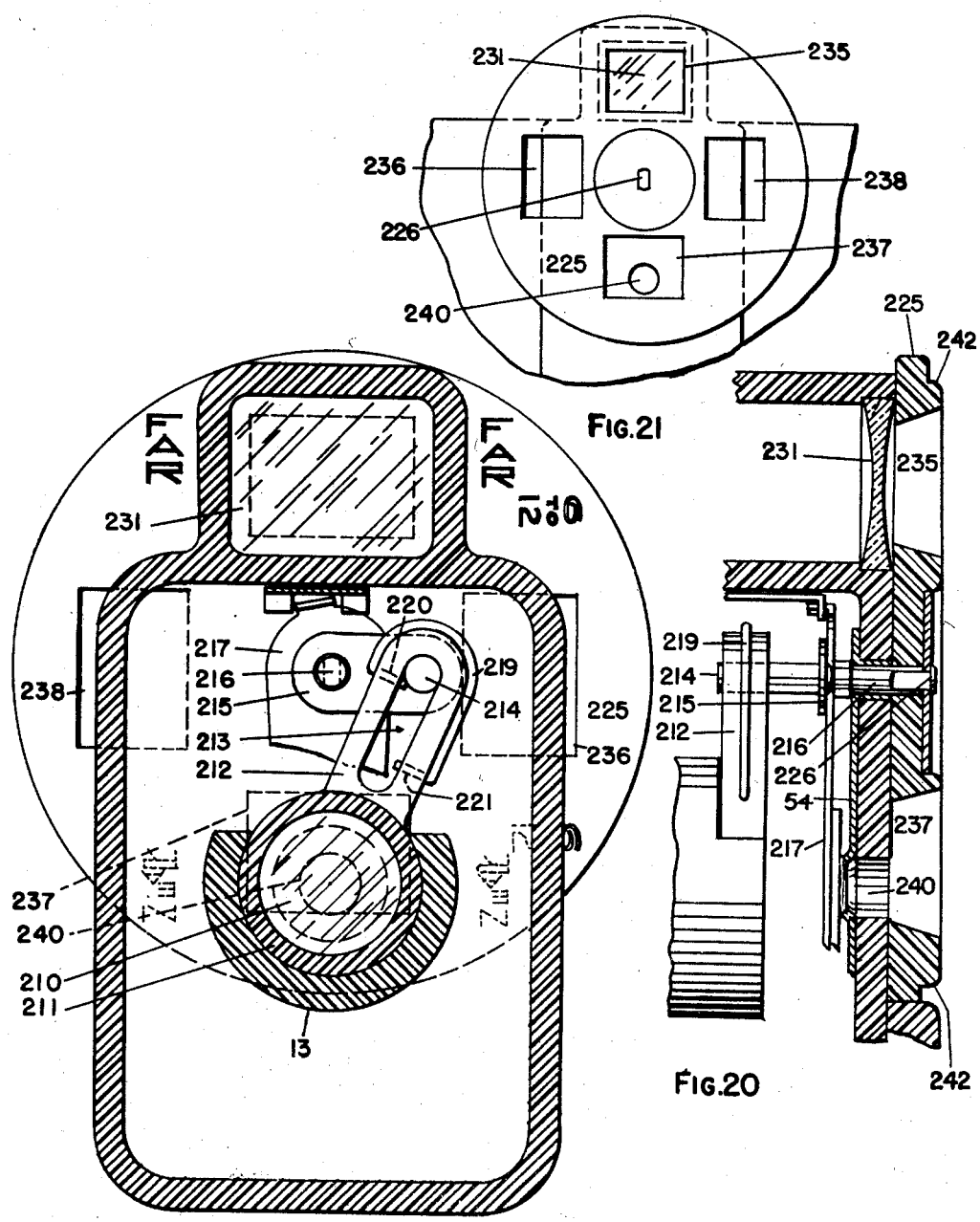

United States Patent Office 2,890,635
Patented June 16, 1959

2,890,635

ROLL FILM CAMERA

Freeman H. Owens, New York, N.Y.

Original application January 22, 1946, Serial No. 642,761, now Patent No. 2,622,496, dated December 23, 1952. Divided and this application December 17, 1952, Serial No. 326,418

24 Claims. (Cl. 95—31)

One primary purpose of this invention is to provide a camera which is compact, easy to manufacture and operate, and very inexpensive but has characteristics and advantages which at the present time, so far as I am aware, are found only in apparatus which is complicated in construction and use and much more expensive. My invention lies in part in the provision of new and improved elements which make possible the accomplishment of my above described major aim and also in a new, improved and simplified combination of these parts into a small, cheap and highly efficient instrument for the taking of still photographs.

This application is a division of my co-pending application Serial Number 642,761 filed January 22, 1946, and patented December 23, 1952, as Number 2,622,496. Application Serial Number 326,417, filed December 17, 1952, which upon April 24, 1956, matured as Patent Number 2,742,835, is a continuation-in-part of that parent application and hereof.

Camera and flash-gun

Another primary purpose of this invention is to provide a novel combination of a novel camera and a novel flash-gun or alternatively, such a combination with a conventional flash-gun substituted for my flash-gun. My camera which is a part of this combination is only slightly more expensive than it would be without such features and is less expensive than a conventional camera of comparable excellence in other respects, but it is so constructed and arranged that it especially and readily cooperates with a flash-gun. This flash-gun may be particularly adapted for use with my improved camera or may be conventional and may be purchased later than, or, if desired, at the same time as the camera. Moreover this arrangement enables a manufacturer of my devices to supply to his dealers a plurality of different models of cameras each having more or fewer of my novel features in accordance with the price of each together with a plurality of different flash-guns which a photographer may select for use in any combination which his purposes, tastes and pocketbook may suggest. Moreover, this invention includes the use of a plurality of flash-guns all of which are simultaneously operated under the control of my camera, the necessary source of electricity being disposed either in the camera or the gun. It also includes the provision of a flashlight enabling a photographer as an aid to his own vision to apply light to a scene which he is about to photograph, this illumination being fed, if desired, by a battery within the camera but controlled independently of its automatic switching and synchronizing mechanism.

A related object of this phase of my invention is the conservation of all of the advantage of a built-in flash-gun but with the elimination of its inevitable disadvantages. The disadvantages which I avoid include the necessity that a user pay the extra cost for a flash-gun including a switch and synchronizer when he buys the camera, whether or not he can afford it or really then needs the flash-gun. I also make it possible for the user to avoid the extra weight and size of a combination instrument on those numerous occasions upon which he wishes to use natural illumination only, yet at negligible increase in cost or weight for the camera alone.

The versatility of this invention is such that I may utilize my novel camera with a battery assembled therewith or with my novel flash-gun which carries its own battery or with a conventional flash-gun or with no flash-gun, all necessary adjustments in current supply, switches and connectors being automatically or simply made by novel and improved devices.

As this statement of the objects of my invention proceeds, I shall explain those that are separately served by my camera and flash-gun as well as those which result from their combination.

Grip and operation of camera

My camera is designed particularly for amateur use with or without artificial illumination by persons who are unskilled in photography. For such individuals it is important that: (1) the body of the camera be so shaped and arranged that a user may maintain a firm grip upon it while he is taking a picture; (2) the control of the release of the exposure mechanism will not move the camera as a whole thereby blurring the picture; (3) an unskilled or careless user is unlikely to obscure the lens by the fingers of the hand or hands with which he holds the camera; and (4) while a photographer holds the camera with such unusual steadiness he may observe the scene to be photographed through an optical viewing lens system. Further discussion of structures which accomplish these results and claims thereto will be found in my said parent application.

To aid in securing these results I form semi-circular protuberances embodying re-entrant curves upon vertical axes in the front and rear of each side of the camera body. These protuberances furnish a user a firm grip by which he holds the camera to his eye to view a scene and make an exposure and also house a roll which is being exposed, the spool upon which it is being taken up and two additional rolls or alternatively two cells for a synchronized flash-gun, or flashlight bulb or flood lamp. From the space between these protuberances a portion of the camera which carries the lens and shutter and devices for electrically controlling a flash-gun projects forwardly sufficiently far that there is little danger that a finger of the photographer will obscure the lens. Thus in top plan my camera resembles a capital letter T, with the forward projection representing the leg of the T and the protuberances being situated adjacent each end of the cross-bar. Between this forward protuberance on the right side and the forwardly projecting portion of the camera a control button, convenient to the index finger of a user's right hand with which he holds the camera, is movable in a direction parallel to the longitudinal axis of the camera to release the shutter and in a straight line toward the body of the user, with the advantages and characteristics stated in my parent patent. When the user wishes to take a picture without artificial illumination he preferably grasps the camera firmly in both hands with the two thumbs about the rearward protuberances and the fingers, except one index finger which operates the shutter release, embracing the forward protuberance.

The presence of these rightward protuberances in close proximity to the shutter release control element makes possible effective cooperation of my camera and my novel combination of flash-gun and camera. By the use of the right hand only a photographer firmly grips the camera by this protuberance with the index finger free to manipulate the shutter release control button. It will be noted that the fingers of the photographer grasp the forward vertical protuberances while his thumb securely holds the rearward protuberances. Simultaneously he may hold my flash-gun in his left hand. He may readily position the camera to the eye so that he uses the finder as he is making an exposure, the making of the exposure being effective to close the circuit to the flash-gun, the battery being mounted either in the camera or in the gun unit. If desired while still holding both camera and flash-gun in picture-taking position a photographer may use the free index finger of the left hand to close and to open a circuit to a flashlight, which is fed by the same battery as the flash bulb but independently controlled.

Control of shutter

Movement of this single shutter release control button as above described is communicated to my new and improved shutter and the switch for a flash-gun by a highly simplified control lever and its few associated parts. The shutter itself, as well as the control mechanism therefor, is also unique so far as I am aware.

In the prior art known to me shutters of this general type are ordinarily released by a first spring and thereafter reset by a second spring which of course must be stronger than the first spring since it must overcome the power of the first spring. As a result such shutters are operated by opposed and antagonistic spring pressure with the result that a user when he releases the first spring to take a picture must apply sufficient pressure to tension both the first spring which currently releases the shutter and the second spring which later resets the shutter. As a result, the increased power which the user must apply to the camera is much more likely to move the camera and hence secure a negative with a blurred image. In my improved shutter, however, I completely eliminate the stronger or resetting spring. I employ only one spring which except at the instant before the exposure is under very light tension. The only purpose of this spring is to form a toggle which is broken in order to give an exposure the timing of which is automatic and not under the control of the photographer. This shutter is reset as the photographer winds the film to the next frame in order to be ready to take the next picture.

Winding of film resets shutter

An important characteristic of this phase of my invention is that the shutter release control button by which a photographer makes an exposure and simultaneously illuminates the scene by a flashlight if desired is reset not by spring pressure as is common in this art but by a subsequent act of winding the film to bring a new portion thereof in position for a subsequent exposure. Therefore it will be seen that in the resetting operation as well as in that of taking a photograph it is the fingers of the photographer and not the power of the opposed springs which operate the shutter.

This construction is much more simple, direct and inexpensive than any other which is known to me. It will of course be understood that this arrangement inherently prevents double exposure since the shutter cannot be reset except after a user has operated a film winding knob to advance unexposed film. Complicated mechanism to accomplish this general result is old in this art but so far as I am aware this invention represents the first device of this type which is sufficiently inexpensive so that it can be embodied in a camera to be sold at or near the lowest price level. I reset the shutter by one revolution only of a take-up spool and provide a frictional arrangement whereby a photographer can revolve the take-up roll as much more as may be required to complete the transport of a full frame or picture as conventionally shown by the appearance of the exposure number on the paper on the outside of the film at a colored window at the rear of the camera. Claims to this phase of my invention as illustrated by the structure described herein in its relation to other closely allied devices claimed herein and as illustrated by other embodiments will be found in my co-pending application Serial Number 326,417, filed December 17, 1952, now Patent Number 2,742,835, issued April 24, 1956, which is a continuation-in-part of my said co-pending parent application now Patent Number 2,622,496.

Switch for Flash-gun

Associated with the shutter and mounted upon its shaft and operated by it is a simple inexpensive and improved switch or brush for operating a flash-gun. This is one of the elements which make it possible for this camera to be sold for use with a flash-gun without adding more than a negligible amount to its cost.

A novel and important phase of this aspect of my invention is the provision of means whereby this mechanism closes and thereafter instantly opens a circuit to a flush-gun only when the shutter is operated to take a picture and is without effect upon it at all other times including that at which the shutter is reset.

Positioning of photographic lens

My invention also includes the positioning of a photographic lens within the camera body back of this shutter and of the plane of this switch for the flash-gun. That is to say except when a picture is being taken the shutter is disposed between the lens and the exterior of the camera. Thus the lens is protected from dirt and much more important from the fingers of a user of the camera. Unskilled attempts to clean lenses and their purposeless fingering are common causes of poor pictures. I completely avoid these difficulties and that of dirt.

An exposed lens when made of conventional optical glass suffers much from dirt and thoughtlessness but a plastic lens, being much less hard, suffers much more. It will therefore be understood that a camera constructed in accordance with this invention with the lens inside the camera has unusual advantages when use is made of a cheaper plastic lens whether or not such a lens is of the novel type described and claimed in my co-pending application Serial Number 629,018, filed November 16, 1945, now Patent Number 2,635,289.

Use of plastic lens

When I use my novel plastic lens I much prefer to position it in the factory along its optical axis in accordance with a novel method which forms one of the objects of this invention. According to the principles and practices of my said co-pending application I form a plastic lens integrally with a supporting and protecting rim or annulus. I place the annulus and lens within a cylindrical tube which forms a part of my novel and improved lens holding device. I then move the annulus along the inside of the tube until it is in proper optical relation to the image-receiving surface, such determination if desired being made by conventional photo-electrical methods. As described and claimed in said co-pending application but not shown herein the provision of an accurate positioning annulus integral with the lens itself and a cooperating stop make unnecessary this conventional and expensive step. Then this structure is fixed with the lens in the correct position. The annulus protects the lens portion of the unitary structure from possibility of damage. Alternatively I may position my novel plastic lens as illustrated herein or a conventional glass lens between two plastic annular rings which are slightly heated. Upon cooling they hold the lens in place.

Alternatively if I employ a glass lens I place it in the correct position as above and hold it there by small rings of plastic, one disposed upon each side of the lens and both heated just before this assembly so that upon cooling they are joined to the inside of the cylinder and firmly hold the lens in place.

Setting of photographic lens by movement of mask for finder lens

It is highly desirable to provide means whereby the field of a finder lens is modified in accordance with the position to which an associated photographic lens has been moved to focus the camera thus preventing the difficulties due to unwanted parallax. To accomplish such ends I present novel and highly simplified means for moving a plurality of masks into and out of cooperative relation with a finder lens in accordance with a movement of the photographic lens which changes the focus of the camera. I prefer to move the photographic lens by an eccentric, the pivot as well as the operating devices being common to the lens moving device and to that which rotates the respective masks into and out of cooperative relation to the finder. My invention, however, includes such a movement of the lens itself without interlocked relation with a mask. A related object is to give to a photographer clear and unmistakable indication of the current position of the lens, indicating whether, for example, the instrument is focused for near or far photography.

This construction of mechanism controlling a lens has many advantages among which are simplicity, rigidity and cheapness. This arrangement eliminates gears and racks with their associated bearings and substitutes simple and cheap stampings and rods, yet it is positive and sturdy. A great advantage is the freedom which it gives to the designer who is thus enabled to place his lens control knob anywhere he desires within reason. If conventional racking mechanism is employed to focus the lens, however, the designer must place a control knob or the like at a point upon the exterior of the camera along a projection of a line adjacent and parallel to the periphery of the longitudinal axis of the lens mount or employ gearing or other complicated and expensive mechanism to connect the lens racking gears with a laterally distant knob or rely upon direct movement of an accessible portion of the lens mount.

Stop for film when all pictures taken

A common difficulty of the inexperienced or careless photographer is prevented by novel and simplified means. When the film has been completely wound upon the take-up spool I make it impossible for a photographer to attempt to continue to wind and to attempt to take additional pictures upon non-existent film thereby preventing a frequent source of disappointment and annoyance. This device also prevents a frequent cause of loss of pictures which have already been exposed. Inexperienced or careless photographers making use of conventional apparatus often fail completely to wind up the film upon the take-up spool after the last picture space represented by the highest number upon the paper backing of the film has been exposed. These attempted exposures not only result in no negative but they also fog the final exposures which have been made in due course. By means of this arrangement I assure a photographer complete use of the entire roll of film since he knows that he must continue to wind until another number upon the backing paper appears at the window or the take-up is locked. I accomplish the above results by parts and methods of assembly which are simplified and inexpensive. The provision of such parts and methods is among one of the important objects of my invention.

Multi-purposed parts

One reason why I am able at a low cost to furnish a camera which has these improvements is that I so design a relatively large proportion of the relatively few parts which are necessary for these new results as well as for conventional operations so that they accomplish a plurality of purposes. Similarly I have greatly simplified the construction and mounting of certain of the elements and sub-assemblies of the camera. Such improved and novel arrangements are applicable to arts other than the photographic.

One example within the ambit of this object of my invention is the making of a pintle for a master control plate of a lock which blocks operation of the camera when the film is completely used in the form of a narrow leaf spring operating in an oversized opening in a plate and held in position merely by being slipped into two slots aligned but spaced more closely than the length of the spring, the bowing of the spring as it is pushed into the slot being all that is necessary to assemble the plate in the camera.

For another example, I employ a common pivot pin for the shutter operating plate, a lens focusing lever and the masks which avoid the evils of parallax. Also, I prefer to construct as one piece a mounting which holds the lens and its control arm. One simple wire spring alone serves most excellently for latching both the lens and finder masks in either two or three operating positions.

The film which is thus advanced past a lens within a camera is supported and maintained in position by a single resilient member which is so formed as also to act as a hold-back or tensioning agent to maintain the film taut in the exposure position, thereby accomplishing a plurality of results with a single part which is both simple to manufacture and assemble and even more important simple to use.

By reason of savings secured by arrangements such as the above, which are illustrative only, I am enabled to supply a camera having the operating features which I am describing herein at a cost no greater or even less than that of a device without them.

Housing

I prefer to mount the operating parts which make up my camera in a novel and simplified housing the parts of which are assembled in a manner which so far as I am aware is new as well as improved. All of the parts of my entire camera including the control mechanism and, if desired, the cells for a flash-gun, are carried by a housing which comprises a front member, a back member and an internal support or cone. These elements together with a single baffle plate and one mounting plate for a shutter comprise all of the static or supporting parts of my entire picture-taking device thus materially reducing not only the cost of parts but also and more important that of assembly and of servicing if repairs should become necessary. Certain of the relatively few parts which make up my invention are first mounted, generally in the form of sub-assemblies, upon each of these three main supports. I utilize single pins or shafts to accomplish a plurality of purposes. For one example, a single pin supports the shutter and a switch and helps position the mounting plate. For another, one rotatable shaft supports the rotatable finder mask, helps position the mounting plate, supports the shutter operating plate, and moves the lens to focus the instrument. Then after the parts have been so mounted the inner support or cone, in the form of a frustum of a pyramid, is placed within the front support and two rivets or screws applied, which serve another purpose also. The elements which are mounted upon one support which cooperate with elements upon the other merely slip into appropriate openings. After my camera has been placed in service, a photographer of course must separate the front and back members frequently in order to take out a used film and put in a fresh one. To that end I provide a very simple and improved spring grip which also serves as a mounting by which a cord which supports the camera is fastened to it.

Such frequent separations and reassembly of the two parts of the camera are related to another important object of the invention. Those skilled in this art readily recognize that balance in any camera which as this will ordinarily be held in the hand is of great importance. Since the shutter, lens and associated mechanism are placed well forwardly from the portion of the camera which is grasped by the hands of a user it is desirable that the leverage caused by their weight in this position be counter-balanced by the positioning of the heavier elements of the device as it is ready for use well to the rear and relatively adjacent the hands of a photographer. For that reason as well as others I much prefer to place the cells for a flash-gun in the rearward portion of the camera, which because of my double use of this storage space may also alternatively accommodate the stored rolls of film. The control mechanism therefor, however, as previously stated, is associated with the shutter and hence must be placed in close proximity thereto and in the forward portion of my camera. For these reasons an electrical circuit within the camera must include elements in both of these separable portions. An important object of my invention is to provide means whereby this circuit may be readily and automatically broken and made each time a photographer separates and reassembles the two sections of the camera.

*Electrical connections*

Since according to this invention as has been described a battery for a flash-gun may be carried by my camera upon some occasions and by the gun itself upon others, it will be understood that either element of the electrical connecting means disposed between the camera and the gun may be "live"—that is, carry current. I supply simple and automatically operable means for making such connections without danger of shorting the battery.

One preferred device by which I carry out this object of my invention consists of a cover for connectors which project beyond a surface of the camera and mounting means therefor whereby the cover is readily movable between protective and working positions while always remaining attached to the body of the camera so that there is no danger of its being lost or mislaid.

Another construction by which I effectuate this object is a simple protective annulus for such prongs which cooperate with a spring plug.

According to one embodiment of this phase of my invention and preferably for use when the battery is ordinarily carried within the camera I provide a plug having male connectors of such length and relative position that when the plug is inserted the connectors reach through the front wall into position to be directly engaged by a circuit-making disc or plate of my improved switch. When a user does not wish to employ artificial illumination he does not insert the plug. Consequently at this time the movable circuit-making portion of the switch moves freely without frictional or other contact thereby saving wear and power. Also it will again be noted that I eliminate the cost and complications of parts which are ordinarily employed but retain their function.

Another preferred modification of this phase of my invention includes a specially constructed connector which when placed in one relation to my camera adapts the electrical devices of the camera to operate a flash bulb which is fed by a battery within the camera but when placed in another position upon the camera adapts these electrical devices to operate a flash bulb which is fed by a battery placed within the gun, all projecting connectors being protected in each instance. I accomplish these results by providing two pairs of projecting contact elements, one pair connected to a circuit including the switch disposed within the camera and the other pair connected to a circuit within the camera which when desired may contain cells. Within my novel plug I provide wires which connect one member of each of the above pairs of contacts and hence one leg of each of the circuits within the camera with an external circuit feeding a bulb in a flash-gun and also a shorting plate which connects the other member of each pair of contacts and hence the other legs of each of said circuits to each other. Another shorting plate is carried forwardly of the camera in such position that when the plug is placed in one relation to the camera it connects the shorting plate of the plug and one of the leads therewithin which feeds the switch thereby placing the external circuit served by the plug in electrical relation with the switch only. Hence the flash-gun in this circuit is controlled by the switch of the camera but otherwise is independent of it and of the circuit within the camera which at that time may or may not contain cells. This plug is so arranged that when it is turned over the shorting plate of the camera does not affect the plug. Hence the circuit from the flash-gun includes both the switch and the feeding circuit of the camera, thus feeding the flash-gun from the battery within the camera through the switch.

*Battery for flash-gun*

As previously made clear an important object of my invention related to the foregoing is to furnish a flash-gun which in addition to illuminating the scene with an intensity sufficient for photographic purposes also supplies artificial illumination which enables a photographer to examine his subject before he makes an exposure and to study such aspects as the formation and effect of shadows and other details of composition. According to a preferred embodiment of this invention the battery which feeds both the flash-gun for photography and the flashlight for general illumination and the switch which controls the circuit to a flash-gun are carried by the camera. Since a photographer wishes to use this flashlight at times other than the instant of exposure my invention includes means whereby I control the flashlight independently of the automatic control of the flash-gun by the camera but preferably by electrical instrumentalities which in part are joined with those for the flash-gun.

For many purposes I prefer to embody all of the several elements which I have described above in a single camera or to place them in association therewith since each part cooperates with all other parts in a manner which will be generally understood from the above statement and specifically pointed out in the more detailed portion of this specification which follows. It will be readily understood, however, that each of the improved elements of this invention if desired may be employed without the others. Moreover, under certain circumstances I may prefer to substitute either conventional or other novel elements for those which are described herein. For example the improved shutter which is described and claimed in my said co-pending application Serial Number 326,417, filed December 17, 1952, which upon April 24, 1956, matured as Patent Number 2,742,835, may be substituted for that which is described herein and vice versa, the operation of each in connection with a take-up spool and the prevention of double exposure being similar.

*Objects of invention*

The objects of my invention will be understood from the general statement above as well as from the specific description which follows. These objects include the provision of a camera preferably for use by an amateur which may be sold at an extremely low price but has the certainty and efficiency of operation and results of a conventional instrument which sells at many times its price. Characteristics among many others of my invention include an arrangement of parts and body which simultaneously provides a firm grasp, protection of the lens, removal of likelihood of spoiling the picture by jarring, convenient operation, storage space for films or cells, the prevention of double exposure, re-setting of the shutter by a winding operation, blocking attempts to wind more film when the film is exhausted, prevention of fogging of a film, holding a film in proper relation to the focal plane, elimination of parallax, joint adjustment of focus and movement of masks defining the field of the finder lens system, clear visual indication of current focus of the instrument, devices for synchronizing a flash-gun and for electrically connecting flash-gun and camera, and improved electrical and operational elements of many kinds.

I accomplish all of the foregoing results in a camera and flash-gun the parts of which are most simple and inexpensive to manufacture and assemble. Such a camera is compact, easy to hold and operate, durable, and gives to the user the assurance that no matter how great his inexperience he is more than reasonably certain of securing good pictures.

Other objects, characteristics and advantages of my invention will be clear from the following portion of this specification, the attached drawings, and the subjoined claims. While for purposes of illustration I am showing preferred forms only of my invention it will be readily understood that changes may be made therein without departing from the spirit of my invention or the scope of my broader claims.

The figures

In the drawings:

Figure 1 is a view of my improved and simplified camera in combination with my associated novel flash-gun both held in picture taking position, certain parts being omitted for clarity.

Figure 1a is a sketch which shows how a user may grasp my novel camera when it is not employed with a flash-gun.

Figure 2 is a view, partially broken away and partially in section, of the front portion of my camera looking forwardly, the cover having been removed.

Figure 2a is a fragmentary sketch illustrating combined supporting and braking means for a roll of film.

Figure 5 (sheet 3) is a top plan view partially in section taken on the line 5—5 of Figure 3 and looking in the direction of the arrows.

Figure 5a is an enlarged fragmentary side elevational view showing my novel arrangement of lock and support viewed from the right hand side of the camera.

Figure 6 is an enlarged section taken on the line 6—6 of Figure 5 and looking in the direction of the arrows.

Figure 7 (sheet 4) is a vertical view of the front of the camera looking forwardly, partially in elevation and partially in section, taken on the line 7—7 of Figure 3 and looking in the direction of the arrows. In this figure the lens and mask are set for a far position.

Figure 8 is an enlarged vertical side view largely in section taken on the line 8—8 of Figure 4 and looking in the direction of the arrows. It shows a preferred arrangement of masks, lenses, and shutter and the operation of the switch for a flash-gun, the optical parts as in Figure 7 being set in the far position or infinity.

Figure 9 is a fragmentary view corresponding to the upper portion of Figure 8 but showing the mask for the finder lens in the near or close-up position.

Figure 10 is a fragmentary top plan view illustrating the control of the position of the lens and pivot for the mask and corresponding to Figures 7 and 8 in that it shows the optical parts arranged in the far position.

Figure 11 is a fragmentary top plan view corresponding to Figure 9 and showing the parts in the near or close-up position.

Figure 12 shows a variant of my invention wherein by eccentric mounting I control a photographic lens only. It corresponds to Figure 11 as to optical setting.

Figure 13 is a detailed view of a single disk which serves as a brush or circuit-making element for a switch for a flash-gun.

Figure 14 is a fragmentary view corresponding in general to Figure 7 but showing the operation of the brush.

Figures 3, 4, 4A, 4B, 4C:
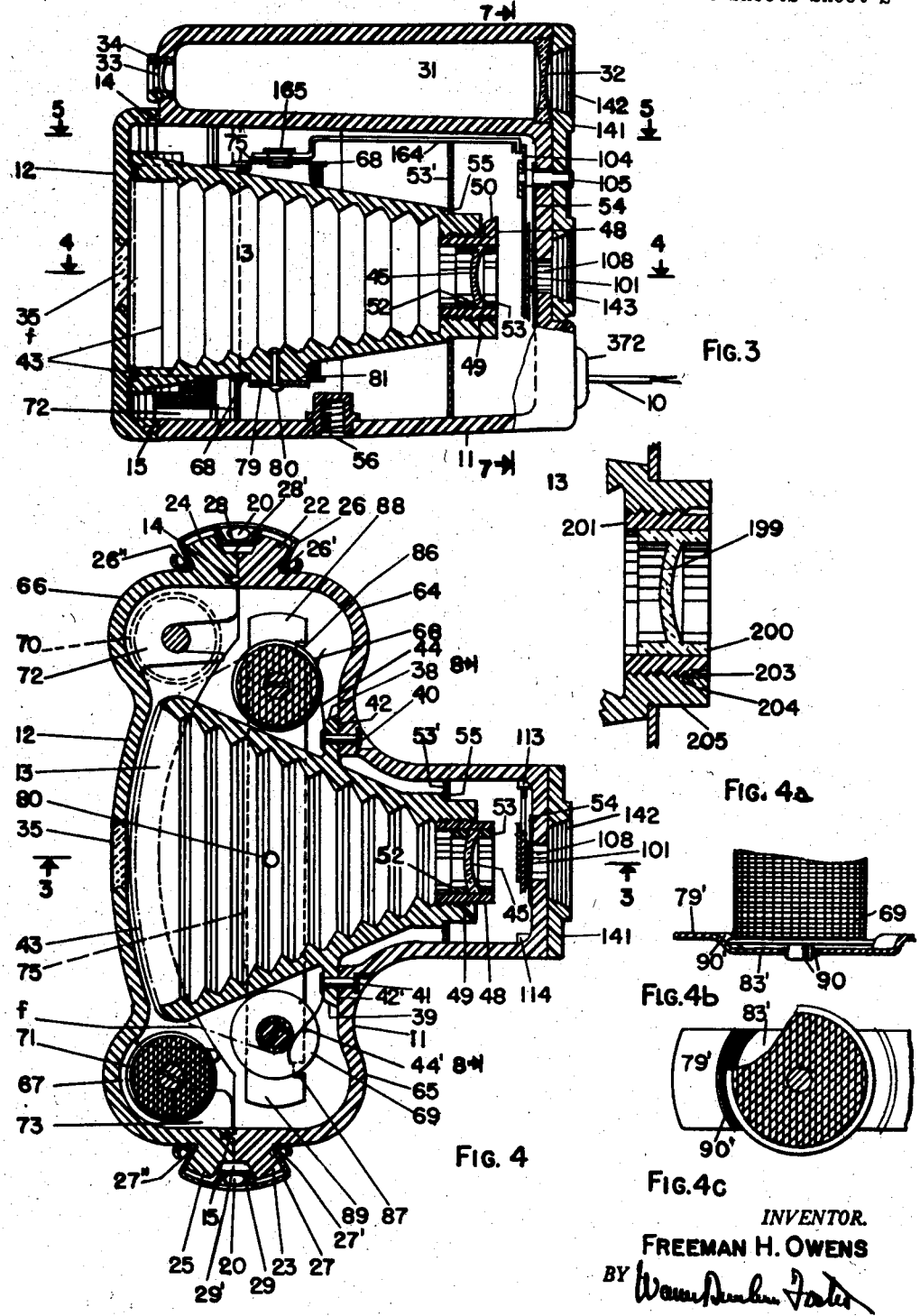
Figure 3 (sheet 2) is a vertical central section partially broken away taken on the line 3—3 of Figure 4 and looking in the direction of the arrows, certain parts being omitted for clarity.
Figure 4 is a horizontal section taken on the line 4—4 of Figure 3 and looking in the direction of the arrows.
Figure 4a is a fragmentary and enlarged vertical section which illustrates a preferred variant lens and holder and method of their assembly.
Figure 4b is a sectional view and Figures 4c a top plan of an alternative construction for supporting a spool.

Figure 19 (Sheet 6) corresponds generally to Figure 7 and shows in vertical transverse section an embodiment of that phase of my invention wherein a lens is movable other than between two positions only, together with automatic devices to minimize parallax.

Figure 20, which corresponds generally to Figure 8, is a front vertical view largely in section of the subject matter of Figure 19 and taken along the longitudinal axis of the camera.

Figure 21 is a reduced front elevation which illustrates an improved turret for use with this form of my invention.

Figure 22 (sheet 3) is a horizontal view largely in section and including a wiring diagram which shows a variant of my invention wherein I mount a storage battery, interchangably with extra films, within the body of the camera, and control a flashlight fed by the batteries housed in the camera independently of the actuation of a flash-gun.

Figure 23 is a fragmentary section taken on a line 23—23 of Figure 22 and looking in the direction of the arrows. It shows a cell for a flash-gun associated with the camera in a position within my camera which may be occupied either by such a battery or by a spare roll of film. It also illustrates automatic contact-forming arrangements.

Figure 24 corresponds to Figure 23 but shows an extra roll of film in place.

The words "right" and "left" and their derivatives as used herein are from the point of view of a user of one of my cameras held so as to take a photograph, except as stated. The words "upper" and "lower," "forward" and "back," and "front" and "rear" and the like are similarly employed, except as noted. When the same or similar parts appear upon each side of the camera or a portion thereof those upon the left are ordinarily designated by an even reference character and those upon the right by an odd number one higher.

Association of camera and flash-guns

Reference to Figures 1 and 1a will indicate how a photographer simultaneously and effectively in one hand holds and operates a camera generally indicated as 8 and in the other holds one of my novel flash-guns generally indicated as 9, the two being electrically connected by a cord 10. Another flash-gun 9' is shown, also controlled by the camera. The index finger of the right hand of the user is so disposed that it readily operates the shutter of the camera, such operation being effective not only to make an exposure but also to close the circuit to the flash bulb. The two middle fingers of the right hand firmly grasp the rightward front protuberance of the camera while the little finger of that hand supports the camera from below and the thumb grasps the camera from the rear. Thus a user can firmly grasp the camera and look through the finder at the very moment of making an exposure. In his left hand he holds the flashgun 9 and without relaxing his grip upon either the flashgun or the camera is enabled to use a free finger of the lefthand to manipulate the switch of an auxiliary flashlight. As later described I may prefer to use a plurality of flash-guns simultaneously operated. As shown a second flash-gun 9′ which may be hung upon a convenient support is electrically connected with the first and operated upon the same circuit. This figure also shows how a one-armed man can readily and instantly hold and operate this camera without the use of a tripod.

*Housing and lock*

The housing for my novel and improved camera 8 consists essentially of a front support 11, a rear support 12 and an internal support or "cone" 13 which is rectangular in cross section. The front and rear portions dovetail as at 14 and 15 and are held together in a manner which is about to be described. Bosses 16 and 17 extend outwardly on each side of an upper portion of the front support. They are pierced with openings 18 and 19 respectively for the reception of a single supporting cord 20. These bosses extended downwardly to form two ears 22 and 23 which are angular in cross section and extend outwardly from the body of the support and preferably are formed integrally therewith. Two corresponding ears 24 and 25 extend outwardly from the back support and are oppositely positioned. Spring clips 26 and 27 slip over each set of oppositely disposed ears and engage grooves 26′, 26″, 27′, and 27″ respectively which are formed at the junction of each ear and the body of the camera, the resilience of the clips being sufficient to hold the two sections together in light-tight relation. Each end of cord 20 after it passes through the above openings is attached to the interior of the clips by portions 28 and 29 thereof respectively which are first bent inwardly from the body of each of the clips and then clamped upon the cord. The portions of these ears which are relatively adjacent upon assembly are so designed that they then form grooves or re-entrant surfaces 28′ and 29′ respectively for the reception of portions 28 and 29. Thus a cheap, certain and simple method of assembling the cord and clip is provided. See Figures 2, 5, and 5a.

When a user removes the back to take out an exposed film and put in a fresh one he merely slips the spring clips 26 and 27 downwardly off the ears. Since the cord 20 is attached both to the clips and to the body of the camera through the holes 18 and 19 in the bosses 16 and 17 there is no possibility of the loss of the fastening devices or of the separation of the cord from the front of the camera. After the desired change of film the two parts are merely assembled again, the spring clips placed in position and the camera is again ready for use. Clips 26 and 27 ride upon ears 22—24 and 23—25 respectively and are held against unwanted upward movement by engagement of their upper edges and the shoulders formed by the junction of the upper edges of grooves 26′ and 27′ and the lower edge of the boss formations 16 and 17. Bosses 16 and 17 are preferably formed integrally with ears 22 and 23 respectively.

*Inner support*

Support 11 includes a chamber 31 at the top thereof at the forward end of which is inserted one element 32 of a finder lens combination, this element being held in place as later described in connection with mask 141. At the rear of this chamber another element 33 of the combination is held by a mounting 34. A window 35 equipped with red safety glass or a plastic sheet is inserted in the rear support 12 so that a user may observe the number of the next picture to be exposed. I prefer to cast this front support in one piece, preferably by making an injection moulding of a synthetic resin, but, if desired, it may be built up element by element.

As is best shown in Figure 4, the central supporting cone 13 is formed in the form of a frustum of a pyramid with forwardly facing ears 38 and 39 which as by pins 40 and 41 are assembled in operative relation with appropriate backwardly facing bosses 42 and 42′ upon the front support 11 as previously described. A rear surface 43 of this cover embodies an exposure window (Figure 4) which is aligned with a photographic lens 45 mounted in the forward portion of the cone. The rear surface of this window furnishes a smooth platen or gate over which the film travels. Light leaf springs 44 and 44′ which bear against one surface of the backing paper P of this film, or of the film if my invention is applied to a camera for use with films not having backing paper. These springs are held in place by the rivets which join the cone and the front portion of the camera.

Before I place the cone in position within the front support of the camera I prefer to mount the lens in the cone. I place the lens in an irregularly shaped member (generally indicated as 47) which comprises a barrel 48 having an external thread which cooperates with internal threads 49 formed in the forward portion of the cone 13 and an upstanding irregularly formed control arm 50. The operation of this single structure and its associated parts later will be described. This lens 45 may be assembled in any desired or conventional manner but I prefer to place it in position by means and according to a method which is novel as far as I am aware. I place the lens 45 between two plastic rings 52 and 53 (see Figure 4). In assembling the lens I prefer to heat both rings 52 and 53 and place them and the lens therebetween in position while they are still warm, establishing the position of the lens preferably by conventional photoelectric means. As the rings cool the lens is held firmly in position.

What one might term the static or inoperable portions of the interior of the camera are completed by a simple baffle plate 53′ which serves both to exclude light from the film receiving portion of the apparatus and to assist in the support and positioning of the cone and a shutter supporting plate 54. The importance and novelty of this latter plate are later described. This baffle plate may be merely swedged into position against a forwardly facing shoulder 55 formed upon the cone.

A conventional female screw 56 standard in thread is provided in the front support to receive a male screw of the tripod (Figures 2 and 3).

It will of course be understood that these three main supports are preferably cast each as one piece, either of metal or a plastic. From the above portions of this description and from a consideration of Figures 4, 5, 15 and 16, it will be evident that the above construction provides in the forward support 11 vertical protuberances 64 and 65 and in the rear support 12 similar protuberances 66 and 67 which are in part generally circular in cross section. Such protuberances are useful in furnishing surfaces which can be firmly gripped by the thumbs and fingers of a user and also in providing space wherein may be placed both a delivery spool 68 and take-up spool 69 for the film which is being exposed and also storage space for spools 70 and 71 for films which either have already been exposed or are awaiting exposure. These latter films are held into position until wanted by finger pieces 72 and 73 which preferably are cast in the back support 12. As described in connection with Figures 22, 23 and 24 I provide an alternative construction wherein I substitute cells for a flash-gun and flashlight for these spare films. Alternatively other supplies or accessories useful to a photographer can be stored therein.

Mounting for the film

As will best be understood by reference to Figures 2 and 2a the operative rolls of film 68 and 69 respectively are supported at the top by a flat narrow plate or strip 75 which is pinned at 76 and 77 to 13, and of course assembled therewith prior to the positioning of the cone within the front support 11. Each roll may be wound with a conventional light-excluding protective paper P, although it is understood that almost all features of my invention may be applied to a camera of a type which accommodates film, such as that of 35 millimeters in width, which is ordinarily used without a paper backing. For simplicity, I am not showing this paper backing in all views although I am illustrating my invention as applied to a camera of a type which uses rolls of film which are so protected. An appropriate opening in the left end of this strip 75 is formed for the reception of the spindle of spool 68. The winding or take-up mechanism for take-up spool 69 will later be described. The right end of this plate 78 is bent upwardly and has a squared end for a purpose which will be described in connection with the take-up roll. In order to support these rolls at their lower ends I provide a novel resilient plate 79 which is mounted at its center by a single pin 80 to a boss 81 cast or otherwise formed in the bottom of the supporting cone. This plate is formed with cups 82 and 83 for the reception of the respective spools. The surface forming each of these cups, however, is bent both upwardly as indicated at 84 and 85 and inwardly upon itself at each side as indicated at 86 and 87. See enlarged fragmentary Figure 2a. This formation of the sides of the respective cups therefore is such that tension is applied to the edges of the sides or flanges of the respective spools, this tension being resilient since plate 79 is made of spring metal. As a consequence enough tension is exerted upon the film as it is wound up to keep the film flat at the aperture of the camera.

An alternative construction for mounting and tensioning a spool, shown as a take-up, is illustrated in Figures 4b and 4c. A plate or strip 79′, corresponding to plate or strip 79 previously described, is bent downwardly to form a cup 83′ generally corresponding to cup 83 but of a critically different shape. The configuration of one side of this cup and the disposition of an opening 90 for the lower spindle of a take-up roll or spool 69′ are such that a shoulder 90′ engages a flange of the spool but the bottom surfaces of spool and cup clear each other. Thus the spool is kept under resilient retardation. The resilience of the plate 79′ forces the upper flange of the spool against plate 75. It will be understood that a similar construction can be employed for the delivery spool.

The take-up

The manner in which the film is wound or taken up will be clear from a consideration of Figures 2, 5 and 6, with particular reference to the last mentioned. As will best be seen in Figure 6 a winding key 91 is attached to a reduced portion of a shaft 93 revoluble within a bearing 94 placed in an upper wall of forward front support 11. This bearing in turn is positioned by another bearing or tube 95 which engages its vertical outer surfaces and is retained by and below an upper horizontal collar 96 formed upon bearing 94 and extending outwardly from it away from the shaft. These bearings are formed with lower collars which respectively engage the inner and outer surface of support 11. It will thus be seen that I furnish a novel structure which can be quickly and cheaply assembled, as will be made more evident as this description proceeds. A tongue connection 97 which is an elongation of the same shaft cooperates with a usual slot in a spindle 98 of taking up roll 69. This one shaft accomplishes a plurality of useful results. It will thus be understood that rotation of button 91 clockwise as shown in Figure 5 will advance the film through the above described construction. A wire spring 99 is wound about a depending flange 100 of ratchet plate 180 which is fixed to shaft 94. This plate is described in connection with the mechanism of which it is a part, this mechanism being that which prevents further rotation of the take-up spool after the film has been completely wound thereupon. The other end of this spring is attached to the bent-up rightward extension 78 of strip 75 previously described. By reason of this arrangement of this spring it will be clear that a photographer may freely wind the take-up roll in a take-up direction, subject to the control mechanism later described, but is prevented from winding the take-up roll in a contrary direction.

To place a fresh film in assembled relation with the camera a user first separates the front and back supports in the manner previously explained and springs down cup 83 by pressing ear 89 thereby freeing the roll in the take-up position which has just been fully wound up. He next places an empty spool in this position. Then he moves ear 88 downwardly and places a spool 68 of unused film in the delivery position. He thereupon unrolls a portion of the black backing paper P and places its end in a slot 99 which is provided in spindle 69. The resilience of the metal of which plate 79 is made serves to hold this fresh spool in the cup. Thereupon he reassembles the camera by merely placing the dove tails together and replacing clips 26 and 27. Or the construction of Figures 4b and 4c may be employed.

The shutter

As will be evident from the previous portion of this description means are provided for resetting the shutter by the film take-up and also for locking the take-up so that after the film has been completely wound thereupon a user will not attempt further winding thereby endeavoring to expose additional photographs with no light sensitive material available and in fact fogging exposures recently made. For convenience therefore I shall now describe the shutter mechanism and parts which are associated therewith since they are operated by an interlock with the take-up which has just been described. Thereafter that interlock will be explained and the lock for the take-up.

As will best be seen by reference to Figure 7 the shutter includes a plate 101 which is mounted for movement upon a pin 102 which is forced within a recess 102′ which is turned forwardly in plate 54 and projects into the front wall of the camera. This pin performs other important functions. Brush or switch member 103 is mounted upon the same pin as a pivot. A shutter control lever in the form of a plate 104 is pivoted upon a pin 105 for free movement thereupon. This pin, like 102, has a reduced portion which passes through a bearing 105′ turned forwardly in the supporting plate and projecting into an opening preferably cast in the front wall. Its extreme forward portion, or its rightward end as viewed in Figure 8, is peened over at 144 in a manner later described in connection with my masking plate with which it is chiefly associated. A single spring 106 completes the shutter. The shutter plate includes an opening 107 which when aligned with iris 108 exposes the film and an ear 109 which is turned forwardly as viewed in Figure 7 to support one end of the shutter spring 106. The other end of this spring is supported by an ear 110 which is turned forwardly from lever 104. The lower end of this lever below ear 110 also is formed with two oppositely disposed ears 111 and 112 respectively which also are turned forwardly so that they engage the side of spring 106 and upon their movement break the toggle of which it is a part. It should be particularly understood that all of the above described parts (and others later mentioned) are placed upon plate 54 before it is assembled with the front portion 11 of the camera. Thus assembly is cheap and quick. These bearings are made so that they fit closely in the openings formed to receive them thereby positioning the plate within the camera.

As the lower portion of lever 104 by means later described is moved in a clockwise direction as shown in Figure 7 ear 111 engages the side of spring 106 which is thereby moved past its center. This spring is under relatively very slight tension before such movement but this tension is very much increased at the very moment of exposure so that the exposure is quickly made. As the shutter is thus released by the breaking of this toggle its opening 107 quickly moves in a clockwise direction as shown in Figure 7 so that it is momentarily aligned with the iris 108 and the exposure made. The lower end of lever 104 at this instant is moved to the left as shown in Figure 7 thereby leaving the opening 108 in line with the lens and unobstructed. Shutter plate 101 as the exposure is made moves from stop 113 to stop 114, these stops being preferably cast in front support 11. While the shutter is being returned from this last mentioned position to that shown in Figure 7 the iris at all times is completely closed by the opaque body of lever plate 104. Simple mechanism which will later be described gives such movement to this lever that the shutter is thus operated.

Associated with the shutter are the brush 103 for the flash-gun and the means for moving the lens and overcoming parallax. The former is directly operated by the shutter and the latter of course conditions the taking of the picture when the shutter is opened.

This brush or switch disk 103 is also mounted upon pin 102 for rotation relatively thereto. As the shutter is operated in a clockwise direction as viewed in Figure 7 to make an exposure, but not when it is operated in a contrary direction for resetting, this brush is advanced. This movement of the switch disk is always in a clockwise direction as viewed in Figures 7, 13 and 14 because of its ratchet construction which is about to be described.

As is clearly shown in Figure 14, notch 118 cut in the side of the shutter plate 101 makes contact with ears or resilient ratchet teeth 119 bent upwardly from the flat body of brush 103 which is made of resilient metal. These teeth consist of terminal portions bent sharply at a right angle from relatively long tongues cut in the brush plate at its outer edge, the portion of the tongues joining these right angular formations to the body of the disk being bent away from the body at slight angles only. It will thus be seen that as the toggle is broken the brush is quickly advanced by contact between these teeth and the notch. Movement of shutter plate 101 in the contrary direction causes it merely to slide over the tongues without moving the plate. As is seen in Figures 8 and 13 other segments 120 bent downwardly from this brush plate wipe contact points 121 thereby completing the circuit to a flash-gun. As the shutter is reset the brush 103 therefore remains motionless and the circuit to a flash-gun continues open. Otherwise without this feature a user who replaced a flash-bulb prior to resetting the shutter would make electrical contact and waste a bulb.

*Control of lens*

The lens, with which the above-described shutter cooperates, as previously stated may be mounted in a threaded barrel 49 which as is likewise clearly shown in Figure 7 has an upstanding control arm 50. Preferably the barrel and arm as by casting are formed in one piece. A central control slot 131 receives a pin 132 which is mounted upon a short control arm 133 which in turn is fixed upon pin 105 previously described for movement thereby, upon which for convenience shutter control lever 104 is pivotally movable. A wire spring 134 having in-turned lips 139 is slipped over the upper end of lens control arm 50. These in-turned lips project through appropriate openings formed to receive them and into the outer edges of slot 131 to form a latch. Movement by means later described of pin 132 rocks arm 50 thereby moving the lens along its axis to focus the camera. Such movement also moves pin 132 first downwardly and then upwardly in slot 131. During such movement it separates the ears 139 against the resilience of the spring and moves freely below them until the full rotation of the device, shown as of 180 degrees, has been completed. At this time the pin is again returned to a position within the spring clip. It first separates the lips and then they snap back to hold the pin and consequently the lens in place. It will of course be understood that as arm 50 is rocked first in one direction and then in the other the lens is moved between near and distant positions of focus. Alternative arrangements are shown in Figures 19, 20 and 21 and described in connection therewith.

*Mask for finder*

Simple means are provided to cause such a movement in timed relation to the movement of a mask for the finder which corrects parallax. As will best be seen from Figure 8, a movable front plate 141 is provided with masks 142 and 143 for alternative association with finder lens 32. This plate is fixedly attached at the forward end of shaft 105. It is peened over at 144 so that it revolves therewith. Knurled surfaces such as 145 and 146 furnish convenient finger grips. It will thus be seen that as this masking plate 141 is rotated from a far to a near position mask 142 which limits the field of view in a manner which is appropriate for a far position will be removed from cooperative relation with the finder lens having element 32 and positioned in front of the taking lens 45 but without effect thereupon. The opening through each of the masks is sufficiently large that when it is placed before the photographic lens it has no effect thereupon. At this time mask 143 which limits the field of view in a manner which is appropriate for the near position will be placed in cooperative relation with finder lens 32.

Appropriate indicia such as "far" 147 and "near" 148 are placed upon each side of plate 141. Thus when mask 142 is in operative relation with lens 32 the *p*hotographer sees the word "far" right side up adjacent this lens but when the position of the mask is reversed and the lens setting is changed accordingly the word "near" or the like appears in this position. Thus the photographer at all times knows, and cannot help but know, that the position of the anti-parallax masks corresponds thereto. From Figures 2 and 7 it will be noted that these indicia are clearly visible from both front and rear, Figures 7, 8 and 10 showing the camera in the far position and Figures 9 and 11 in the near.

This plate 141 also and at the same time serves to hold finder lens element 32 in a recess 149 which is formed or preferably cast in the forward face of finder chamber 32. In the assembly operation the lens element is merely dropped into this recess and in the manner elsewhere described that masking plate fixed into position. Thereby the lens element is firmly held in place without the use of a special part, pin or tool.

From the above description it will be understood that the movement of the taking lens 45 between near and far positions is accomplished by eccentric rotation. That is to say the mount which carries this lens is brought forwardly or backwardly by the rotation of its barrel upon a center other than the optical axis of the apparatus. Such an arrangement permits unexpectedly efficient, simple and inexpensive construction together with rigidity and certainty of operation and freedom from wear. It is peculiarly well adapted to apparatus such as that which I have described herein but as is also illustrated in Figure 12 it may be employed entirely independently of my novel and effective masking device. In such instances a lens control structure including an arm 150 corresponds to the structure which includes arm 50 of Figure 7. This structure including this arm in turn in the manner previously described moves a lens not shown corresponding to lens 45. Arm 150 is pivoted upon a pin 151 which corresponds to pin 132 above described. This pin works in a slot, not shown, in arm 150 which corresponds to slot 131 in arm 50 and is fixed to and rotated by a short cross arm 152 which corresponds to arm 133. This arm in turn is fixed to and movable with a control shaft 153 which passes through a front wall 154 of a camera and is operated by a focusing knob 155 and supported by a hub 156. By reason of this construction it will be seen that rotation of knob 155 moves the photographic lens to focus the camera independently of the operation of a masking or other similar device. Conventional detents or a friction grip, not shown, may be employed to hold this mechanism in any position to which it has been moved. The advantages of this construction have been set out in the introductory portion of this specification.

An important variant of this phase of my invention is described hereinafter in connection with Figures 19, 20 and 21, which include a showing of lens 210, mask 225 and their associated parts.

*Master control lever*

In order to give desired movement to control lever 104 which operates the shutter as previously described an ear 161 is turned therein facing backwardly from the standpoint of a user of the camera as he takes a picture and forwardly as viewed in Figure 7. This ear works within an over-sized space between ears 162 and 163 bent downwardly from the plane of an irregularly shaped master control lever 164 which as best shown in Figures 5 and 15 is pivoted upon pin 165 which for convenience is mounted upon plate 75 and cone 13.

Figure 15:
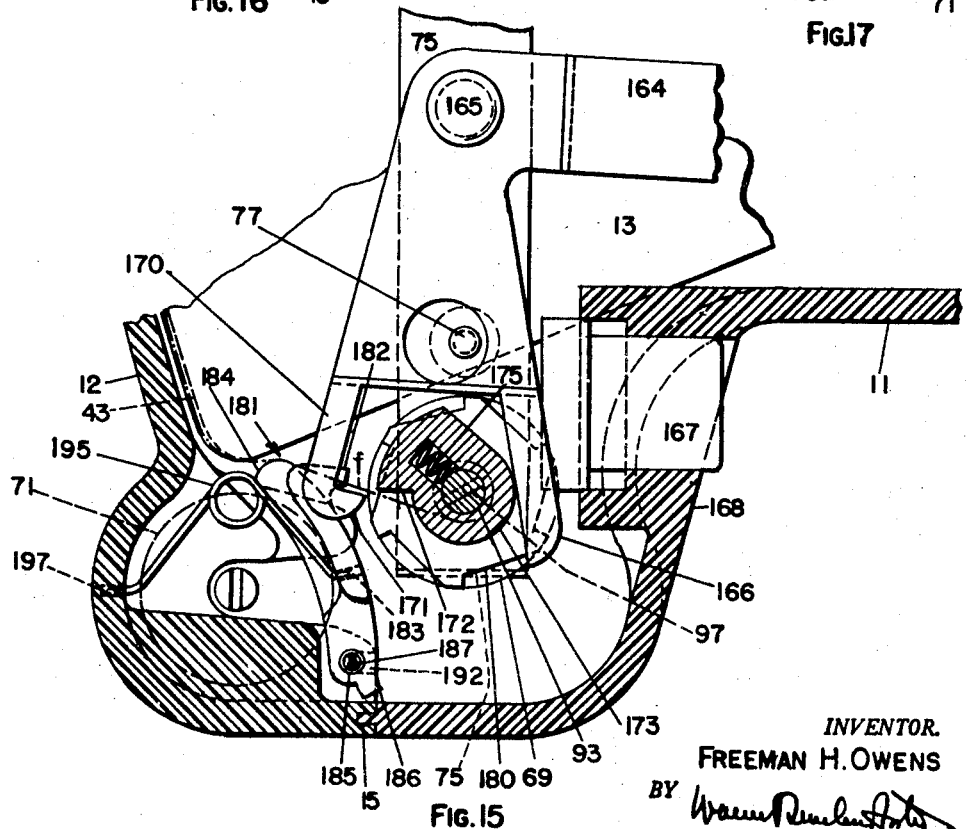
Figure 15 (sheet 5) is an enlarged fragmentary horizontal section, corresponding in part to the lower portion of Figure 5, showing the take-up and blocking devices, the take-up member being free to move under the influence of the winding key after an exposure has been made.

The rightward and upper end of this lever from the standpoint of a user of the camera or the lower end as shown in Figures 5 and 15 is both bifurcated and bent upwardly away from its body portion toward the top of the camera. A forward leg 166 of the bifurcation is engaged by control button 167 which is mounted in a rectangular opening in a relatively straight boss 168 which extends across the top of the finger holding depression in the right side of the forward wall of the camera. Inward movement of button 167 (or movement leftwardly as viewed in the above figures) rocks this master control lever in a clockwise direction upon pivot 165 and thereby moves shutter control lever 104 so that it engages spring 106 and breaks the toggle of the shutter thereby making the exposure and closing a circuit to a flash-gun. It will be understood that although spring 106 is under slight tension the greater part of the power of this operation is furnished directly by a finger of the photographer.

*Front sub-assembly*

As previously stated, a chief object of this invention is to provide a camera having many novel and desirable features but so designed that it can be manufactured and sold at a price low enough to make it available for the great body of photographers who appreciate a fine instrument but cannot afford one at present prices. One reason why I achieve the result is simplicity and quickness of assembly with consequent saving in cost. For example, I first assemble all of the parts for the shutter and flash-gun switch on front mounting plate 54, including pin 102 and shaft 105. Then this sub-assembly is placed in the front support 11, pin 102 and shaft 105 passing within the front wall. These bearings position the plate upon the front wall. Thus pin 132 and ear 161 project backwardly toward the rear of the camera. Control lever 164, the lens in its carriage and including arm 50 with slot 131, and baffle 53' already have been assembled with the cone. A worker places the cone in position and inserts rivets 40 and 41 which also support springs 44 and 44'. As a result of this operation and nothing more the lens and shutter mechanisms are completely assembled. Slot 131 of the lens structure carried by the cone engages pin 132 facing backwardly from the front support and ears 162 and 163 which face forwardly embrace ear 164 which faces backwardly. Thus the actuating members of the controlling mechanism for the shutter and lens and the actuated members of the controlled mechanism of the shutter and lens are instantly placed in operative connection merely by this act of assembly and without the use of a jig or fixture or rivet, pin or screw.

It will have been understood from the previous portion of this specification that at the time that the cone 13 is placed within the forward support 11 all of the parts carried by the cone additional to those just mentioned have been assembled with it, notably the plate 75 which is positioned upon the top and the plate 79 upon the bottom. Explanation of the simple assembly of the parts associated with the winding key will be presented after all of those parts and their operation have been explained.

*Operation of control members*

The simple mechanism which operates the above described control members and resets the shutter will now be described.

Left fork 170 (as viewed in Figures 5 and 15) of control lever 164 terminates in a pawl 171 which engages a ratchet 172 which is cut on the periphery of a control cam 173 which is frictionally mounted for movement with and relatively to shaft 93. A compression spring 175 placed within an appropriate opening in this cam and bearing against the shaft makes it possible for revolution of the shaft to move the cam so that its ratchet engages the pawl but permits further movement of the shaft thereafter. When button 167 is moved inwardly toward the camera or backwardly to make an exposure or to the left as viewed in Figures 5 and 15, the pawl and ratchet are separated and shaft 93 left wholly free to move in a winding-up direction—counter-clockwise as viewed in these figures. Figure 15 shows such movement as having been made. Further movement of this cam, however, brings it into contact with right leg 166 of the control lever and thereby resets the shutter by moving the control lever back from the position of Figure 15 into that shown in Figure 5. Still further rotation brings pawl 171 into contact with ratchet tooth 172 as shown in Figure 5. Since a single rotation is not enough to advance a sufficient length of film into picture taking position the user continues to rotate the button 91 against the relatively slight power of spring 175 until the next number upon the paper P appears at window 35.

It will therefore be understood that Figure 5 shows this mechanism after one exposure has been made and the film wound into position for taking the next exposure while Figure 15 shows these parts in the position which they assume after an exposure has been made by movement of button 167 but before knob 91 has been rotated to bring a fresh film into picture-taking position. An exposure can be made when the parts are in the position of Figure 5 but no exposure can be made when the parts are in position as shown in Figure 15.

As previously pointed out this simple arrangement makes it possible for me to dispense with elaborated mechanisms, such as have been previously proposed, to compensate for the increase in the diameter of the take-up roll as the film builds up but to retain the practical advantages of such complicated mechanism.

*Prevention of double exposure and exhaustion of film*

As is best shown in Figures 15, 16, 17 and 18 simple means for preventing an attempt to take a picture after the film has been exhausted are also associated with take-up shaft 93. Such means are claimed in my co-pending application Serial Number 326,417, filed December 17, 1952, which upon April 24, 1956, matured as Patent Number 2,742,835. A second ratchet plate 180 associated with this take-up shaft is fixed for revolution therewith. An irregularly formed multi-purpose master stop plate generally indicated as 181 controls this operation. It is formed with a control tooth 182 which projects forwardly or rightwardly as shown in the figures, a spring receiving opening 183, a film or paper-engaging surface 184, an oversized pintle-receiving opening 185 and a stop protuberance 186.

Figure 18:
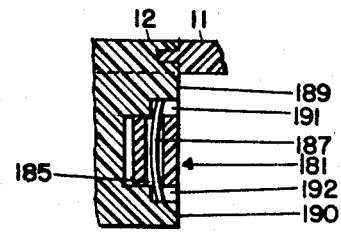
Figure 18 is a sectional sketch showing a preferred mounting for my control device for film winding.

As best shown in Figure 18, this plate is mounted in a novel and effective fashion. A spring pintle in the form of a light round spring 187 is placed in the opening 185 with its upper and lower ends protruding beyond the plate. Supporting bosses 189 and 190 project toward the interior of the camera from casing 12, preferably having been cast therein, and are so spaced as to clear the edges of master plate 181. Parallel slots 191 and 192 of a size to receive the ends of spring pintle 187 are cut in opposite surfaces of these bosses in alignment with each other. The plate with the spring pintle in position is merely moved toward the back wall of the exterior casing 12 with the ends of the spring pintle in engagement with the slots. The length of the pintle is slightly greater than the distance between the bottom surfaces of the two slots which receive it. The spring is therefore bowed slightly and its tension is enough to hold the pintle in place. Thus I assemble a pivoted member in my apparatus in what is literally an instant of time and without the use of a tool or fastening device, the resilience of the pintle itself being sufficient to hold it and the master stop plate in position.

Figure 16:
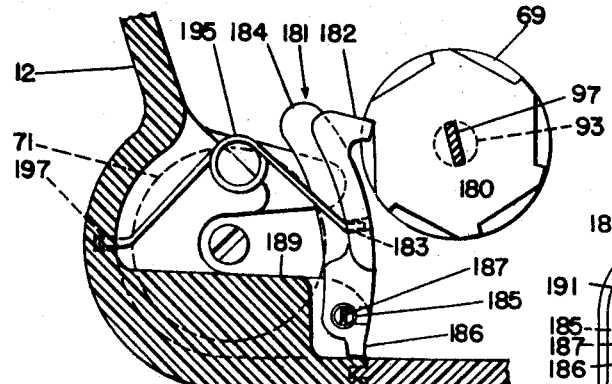
Figure 16 is a detailed horizontal section which corresponds to a portion of Figure 15 but shows the take-up and shutter blocked as when the film has been completely wound up and ready for another exposure.
Figure 17:
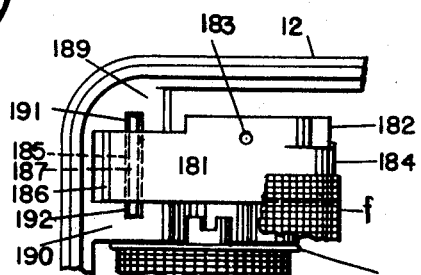
Figure 17 is an enlarged fragmentary side view partially broken away showing my blocking device in free or film-running position before the movement of the take-up has been arrested by the exhaustion of the film.

A wire spring 195 coiled as seen in Figures 15 and 16 extends from an appropriate opening 197 in the back support to the opening 183 in the master stop plate thereby tending to move this plate in a clockwise direction as seen in the figures and to hold the surface 184 in engagement with the paper or film as it is fed.

The operation of this feature of my device will be clear from the foregoing description and from a consideration of the figures. As a user separates back support or cover 12 and front support 11 in order to take out a used film and place a fresh film in position the above described device is of course borne away from the body of the camera with support 12 since it is mounted upon it. Engagement of stop 186 of the master plate with an adjacent portion of the body of the cover limits its clockwise movement as seen in the drawings. After a fresh film has been placed in position the cover member 12 is reassembled with the remainder of the camera. The operation brings surface 184 of the master plate against the paper or the film as the case may be and moves master plate counter-clockwise to the position shown in Figure 15. As the film is fed this surface bears against the paper, or against the film in case no backing is employed as in the camera of the so called miniature type. After the film is exhausted the power of the spring 195 moves the tooth 182 into position to engage a tooth of ratchet 180 as it is revolved by movement of shaft 93. If thereafter the user attempts to rotate take-up knob 91 he finds it blocked.

Blocking of take-up when film exhausted

It will thus be seen that I not only practically speaking remove the danger of double exposure in the manner previously described but also block the take-up after the last exposure has been made upon a given film. Since the shutter can be reset only by the take-up when the take-up can no longer be operated the shutter cannot be reset and the photographer cannot attempt to make further exposures with no film in position opposite the lens. When a photographer feels that the winding key is blocked he knows he must supply fresh film.

Assembly of camera

Having now described the various elements and combinations which are associated with the take-up spindle I can explain the simple manner in which they are assembled therewith. In common with other phases of my invention this portion thereof is characterized by multiple use of single parts. Also, the assembly is quick and cheap and does not require the use of a single rivet or screw or special tool, jig or fixture. Preferably but not necessarily, certain of these parts are first assembled with the front support 11 of the camera, others are placed in position on the cone, and the cone placed within the support and pinned into position as previously described.

According to any method of assembly, control lever 164 and strip 75 are mounted by a common pin 165 upon the upper portion of the internal support or cone 13. That is all, so far as the cone is concerned. Bearing or tube 94 is inserted in its appropriate opening in the upper wall of support 11 and tube or bearing 95 placed over tube 94. Next the upper shoulder 96 of tube 94 is crimped over thus holding both in place relatively to each other and to the support. Then shaft 92 is inserted in the inner bearing and control button 91 slipped over its top which is then peened over to hold button and shaft in position. Thereupon cam 173 with spring 175 in place is slipped upon the lower extended portion of shaft 93, the spring serving to hold the cam in position. I then force ratchet 180 upon the depending tongue 97 of this take-up shaft, wire 99 having been previously placed about the depending shoulder 100 of this ratchet. Thus this ratchet holds in place all of the previously recited parts which are associated with the take-up. Then a worker places the cone within the front support rocking it slightly so that the bifurcated end of control lever 164 clears the take-up shaft. Thereupon as previously stated, the case is riveted to the front support, this act of assembly having also joined the controlled and controlling members of the lens and shutter mechanisms as explained hereinabove. The free end of wire 99 is inserted in the turned up edge 180 of strip 75, this insertion being the only permanent physical connection between any of the parts associated with the take-up and those mounted upon the cone. Master control plate 181 which coacts with this ratchet is independently assembled with rear support 12. Alternatively the cone with the strip 75 and lever 164 previously fastened thereto may first be fastened into position within the front support and the various parts placed upon the take-up shaft by insertion through the open end of the control lever, the resilience of strip 75 being sufficient so that it can be sprung out of the way. It will thus be seen that my arrangement of operable parts not only results in lessened cost of production and increased efficiency and certainty of operation but also ease and cheapness of assembly.

Mounting of lens

As previously stated in connection with the description of the lens 45 and its mounting and as is clearly shown in Figure 4a, I may prefer to apply other novel means and methods to a photographic lens and its mounting in the camera.

If I employ a plastic lens which is manufactured in accordance with my co-pending application Serial Number 629,018, filed November 16, 1945, now Patent Number 2,635,289, I may form lens 199 integral with a supporting and protective annular rim 200. This annulus is placed in a cylindrical mount 201, also of a synthetic resin, with an external thread 203 which cooperates with an internal thread 204 cut in a cone 205 which corresponds to cone 13 previously described. Mount 201 may be formed with or attached to a control formation such as previously described.

I first assemble this lens with its mount. By photoelectric or other conventional means I determine the exact position of lens 199 along the longitudinal axis of the camera in accordance with the optical characteristics of the particular lens. It is of course understood that in spite of modern manufacturing excellence each conventional lens must be placed separately in correct position relatively to the film in accordance with its own peculiar characteristics. This method is alternative to that previously described involving the heating of separate rings 52 and 53. If desired, such a plastic lens with an annulus may be placed in position by the use of two heated plastic rings as previously described or otherwise. As stated and claimed in said last mentioned co-pending application I am able to avoid this necessity in such cases as I form my unique plastic lens with a stop or other formation which accurately determines its position along the longitudinal axis.

*Overcoming parallax: Alternative lens adjustment*

As previously stated in an important variant of my invention the photographic lens may be placed in more than two positions and at the same time provision automatically made to overcome parallax. This form of my invention is shown in Figures 19 to 21.

A lens 210 is mounted in a threaded barrel 211 with which there is formed or to which there is attached an upstanding control arm 212. The lens mount may be closely similar to that previously described and shown in Figure 7 and those associated therewith. A central control slot 213 in this arm receives a pin 214 which is mounted in a short control arm 215 which is fixed upon pin 216 upon which is pivoted a shutter control lever 217 which corresponds to lever 104 previously described. The formation and control of this control lever and the parts associated therewith may be as previously described. A round spring 219 is formed with two inturned lips 220 and 221 respectively which extend through appropriate openings in the side of the arm and into the central control slot but at vertically spaced points.

For convenience, I am describing this embodiment of my invention as having three positions—a first, where the instrument is focused for infinity, this position being characterized as "far," a third or "close-up" or "near" position, and a second or intermediate position disposed between the first and third, this position being characterized for purposes of illustration only as from 6 to 12 feet.

In the position shown in Figure 19 the lens is latched in the far position by engagement of pin 214 by internal ear 220. As arm 215 is rotated clockwise by a mechanism which will later be described pin 214 moves downwardly in slot 213. During the first portion of such continuing movement it engages ear 220 and moves it to the left as shown in this figure. Further movement after control plate 215 has been rocked almost ninety degrees causes it to move ear 221 to the right, likewise as shown in this figure. At this point it will be understood that arm 212 is perpendicular and shaft 214 by coaction with the lower portion of ear 221 is latched at the bottom of slot 213. This represents the second or intermediate position of focus of the instrument. Further movement of control arm 215 in a clockwise direction as viewed in Figure 19 will still further rock the upper portion of arm 212 until arm 215 extends horizontally to the left. Such movement first causes pin 214 to move ear 221 to the right thereby unlatching the lens from the second position. As continued movement of the short arm causes it to approach a horizontal position shaft 214 moves ear 220 to the left. Thereafter ear 220 latches the lens in the third or near position with the pin at the top of the slot. This spring is relatively light so as not to hamper movement of the lens between the three positions although of sufficient magnitude to hold the mechanism in any one of the three positions once it has been moved there. One advantage of this arrangement other than its simplicity and ease and cheapness of manufacture and assembly is that all three positions are definite and a user by feeling or sound is conscious of the exact position of the lens. He is thus enabled to focus his instrument without looking at a dial or calibrations. Any reasonable number of positions may be added, additional latches being provided or a friction detent being substituted.

*Turrent or mask control of lens*

The above described movement is communicated to the lens through short arm 215 by a mask or turret 225 which is attached at the end of shaft 216. Thus it will be understood that movement of this turrent is effective to move the lens between the three positions which have been indicated above.

This turret also cooperates with a finder lens system, of which a forward element only is shown, mounted as previously described. Masks for this lens are carried by or formed integrally with the turret. Each limits the field of the finder lens to an extent appropriate to the particular setting of the photographic lens than in effect and thereby corrects paralax. In its most simple form this turret may be a flat plate with four openings, as shown for illustration herein. Four openings 235 to 238 inclusive which are employed to correct paralax are preferably of the same size but differently spaced from the axis of the plate. In the position as shown, this position being the one which has been previously characterized as the first or far, opening 235 is associated with finder lens 231 and opening 237 is apposite iris 240 which is aligned with the photographic lens 210. It will of course be understood that mask 237 has no effect upon the photographic lens but that mask 235 limits the field of the finder lens to that which is appropriate for the far position of the photographic lens. As the user rotates this masking plate in a clockwise direction as for example by grasping an outwardly extending knurled annulus 242 he brings mask 236 into the second position opposite lens element 231 and mask 238 into position opposite iris 240. At this time it will be understood that control shaft 212 is vertical and the lens in the second or middle position above mentioned. The distance of opening 236 from the center is such as is appropriate to this intermediate position. Further rotation of the disk advances mask 237 to cooperative relation with lens element 231 and places mask 235 opposite iris 240. The parts are now in the third or close-up position above mentioned. This mask 237 is appropriate for the near or close-up position to which the photographic lens has now been advanced. Openings 238 has no function except to furnish a clear space opposite the iris for use in the intermediate position.

*Parallax*

The principles which are involved in the above device will be briefly reviewed. When both the camera lens and the finder lens are directed upon a given object the longitudinal axes of the two lenses coincide at the object thereby when considered to be joined by a base line forming the sides of a triangle, with the object at the apex and the altitude a line joining the object and the base. If the camera is moved toward or away from the object the altitude is changed and the sides, which are the longitudinal axes of the two lenses, must be correspondingly shifted if they are still to coincide upon the object. By reason of the above laws in fact or in effect the longitudinal axis of the camera lens and that of the finder lens system must be relatively moved toward each other as the camera comes nearer the object to be photographed and away from each other as the camera is disposed more distantly from the object so that at all times this object is located at the apex of the triangle. Thus parallax is overcome. As a practical matter, it is the finder lens system which controls. A photographer moves his camera up or down until he includes within the field of the finder the object which he wishes to photograph. The axis of the photographic lens follows; only if it intersects the object at which the finder is aimed does the photographer secure the picture which he desires. Therefore for satisfactory results the two axes must intersect. Instead of actually phyiscally shifting one or both lenses in order to accomplish the above result it has been found equally effective to change the upper and lower boundaries of the field of the finder and then bodily to move the camera.

In my camera I prefer to make this change by rotation of masks as described above. These masks therefore are so designed that they limit the field of view of the finder in accordance with the field which is covered at the various automatically corresponding adjustments of the photographic lens and make certain that the object which the user sees in the center of the finder is that which will appear at substantially the same place in the photographic lens and hence in the photograph. Thus when a "close-up" is to be taken of a near by object I provide a mask which cuts off the foreground and extends the background thereby forcing a user to lower his camera in order to direct his vision at an object which is positioned within the field of the photographic lens when the instrument is focused for such a near-by object. When on the other hand he wishes to take a far view a mask operatively interconnected with the lens is placed in position of such shape that he can see relatively more of the foreground and less of the background with the camera held in the same position as before. Hence to cover a wanted distant scene with the photographic lens he is forced to tilt the front of the camera upwardly thereby making the line of sight from his own eye and that from the photographic lens as the instrument is then focused converge upon the distant object. Other masks similarly controlled in accordance with the movement of the lens operate similarly.

*Battery for flash-gun within camera*

As has been stated in the introductory portion of this specification I may employ my novel camera with novel or conventional flash-guns. The battery may be mounted within the camera or within the flash-gun, whether the flash-gun be novel or conventional.

In either case, however, I provide novel means within the camera for controlling the operation of the flash-gun and a plurality of novel means which are selectively available for electrically connecting my camera and my novel or any conventional flash-gun.

As will be observed from a consideration of Figures 1 and 22 I may prefer to make available for a photographer's simultaneous use a plurality of flash-guns all of which are controlled by my camera. Under many conditions a photographer wishes to use at one time more than one source of artificial illumination. While he may care to illuminate a face for example by a flash-gun which he holds in his hand so that he can direct it instantly and at will he may also desire additional artificial illumination, as for example, to destroy unwanted shadows or furnish back lighting or emphasize or "model" a particular portion of a scene which he is photographing. To this end I prefer to make the connectors which are attachable to my flash-guns of such nature that additional plugs as desired may be inserted therein, cords connected with these plugs being effective to operate other flash-guns, all, however, under the control of the camera.

In one general arrangement of means for artificially illuminating a picture to be taken by my camera I place cells for a flash-gun within the space previously described which is otherwise available for the carrying of spare or exposed rolls of films. See Figures 22, 23 and 24 upon Sheet 3. When desired these cells are slipped in the receptacles otherwise supporting extra or used films. When they are not needed they may be taken out and films stored in the camera in their place. Thus one set of devices accomplish a plurality of results. The instrumentalities which hold the cells or film rolls in place have sufficient resilience to accommodate substantial differences in height. In other preferred arrangements I house the battery within a flash-gun.

As best shown in Figures 22, 23 and 24 upon Sheet 3 I may place cells B and BB within the space formed by the rearward protuberances 66 and 67. Alternatively this space is available for the storage of rolls 70 or 71 of films, fresh or exposed. The bottom of each cell or each roll is supported jointly by shoulders 320 and 321 which preferably are cast into cover 12' of the camera and by resilient metallic contact fingers 322 and 323. These shoulders have central openings to receive the protruding spindles of film rolls. Resilient metallic fingers or brackets 326 and 327 engage the upper portion of each cell or of each roll. A cross lead 329 connects contact finger 323 associated with the bottom of this rightward cell and bracket 327 associated with the top of the leftward cell. A leftward female contact element 330 is connected with contact spring 322. The rightward contact spring and a female contact element 331 disposed upon casing 12' adjacent the point at which it engages casing 11 also are electrically connected. Male contact elements 332 and 333 cooperatingly disposed in relation to the female elements just described are mounted upon the camera housing 11 so that when the two housings are brought together the elements will unite and complete a circuit.

A lead 334 extends from contact element 332 to jack 339. Male element 333 is connected by lead 335 to contact point 336 which together with contact 337 are engaged by brush 103' corresponding to 103 previously described. Contact point 337 is connected to jack 339. A by-passing lead 338 directly joins lead 335 to one of the connectors of jack 339 and contact point 337 is directly joined to another connector of this jack. A plug 340 may be inserted in this jack and by a three wire circuit generally indicated as 342 is attached to a connector generally indicated as 343. One lead 345 is common and does not pass through the switch and the by-pass of the camera. A second lead 346 is connected through the switch and a third lead 347 is connected by way of the by-pass. Upon the other side of the plug 343 lead 346 is extended to feed flash bulb 350 and lead 347 is extended to one side of flashlight 352. An extension of common lead 345 furnishes the return of the circuit of the flash bulb and is connected through a switch 354 to a short lead 355 which completes the circuit of the flashlight.

By reason of this construction it will be evident that when cells B and BB are placed in position they will be in series and connected to the female members of the contacts carried by the cover or back separable casing of the camera. When the cover member is placed upon the body member the battery will be in circuit with the switch 103' of the camera and through it to the flash-gun when the plug 340 is duly inserted. It will be understood that as an exposure is made the circuit comprising leads 345 and 346 is closed and flashes bulb 350. Alternatively when switch 354 is closed a circuit comprising leads 345 and 347 is made independently of the automatic camera-controlled switch 103'. The novelty, convenience and efficiency of this arrangement will be obvious to those skilled in this art.

*Advantages of invention*

The advantages of my invention will have been made apparent from the foregoing portion of this specification, the attached drawings and the subjoined claims. They include the provision of a camera which is simple and inexpensive to manufacture and easy to use, particularly in that if desired it may be firmly grasped by one hand in picture taking position while a photographer through a finder watches the scene he is about to photograph and holds a flash-gun in his other hand. Other advantages include arrangements, devices and methods which make the construction and assembly of a camera much cheaper and quicker than previously known, so far as I am aware, while retaining safeguards and conveniences which are novel and improved which accomplish results previously not found except in much more expensive instruments. Among important advantages are improved control and electrical devices both of a camera alone and in combination with a flash-gun or with a flashlight or a plurality of each thereof.

I claim:

1. In a camera, a front enclosing casing having an exposure opening therein, a shutter for said opening, said shutter being mounted upon said front casing at the front thereof, a movable operating plate for said shutter, a shaft upon which said plate is mounted, an inner support disposable within said casing, a lens, a lens control member exterior to and mounted upon the front of said front casing and attached to said shaft for moving it, lens linkage including a lever for moving said lens to focus the camera, shutter linkage including a lever for moving said operating plate, an operating connection between said shaft and said lens lever, said lens and both of said linkages being mounted upon said support, said lens control member and said lens lever being so disposed that upon the assembly of said support within said front casing they operatively engage thereby making said lens operable by said lens control member, said operating plate and said shutter lever having cooperating formations which are brought into operable relation by the act of assembly of said support within said casing, a mount for rolls of film at the rear end of the said support, a revoluble take-up for the film mounted upon said front casing at the rear thereof, a connection between said take-up and said lever for moving said lever to move said operating plate to reset said shutter upon movement of said take-up, an exposure button for said shutter linkage so disposed as to be brought into operable relation to said shutter linkage by the act of assembly of said inner support with said front casing, and stop mechanism mounted upon said rear casing which by the assembly of said casing is made operative upon the film to disable said take-up and said shutter operating linkage after the film has been exhausted.

2. In a camera having an enclosing top wall, a plate disposed below and parallel to said top wall and having instrumentalities for supporting the upper end of a take-up roll of film, instrumentalities for supporting the lower end of said roll, a revoluble take-up shaft extending through said wall and to a point adjacent said plate, means for attaching said take-up roll and said revoluble shaft, a button external to said wall and attached to said revoluble shaft for imparting revolution thereto whereby said take-up roll is revolved, a disc with an annular depending flange mounted upon said shaft and revoluble therewith, said shaft passing within said flange and said flange having a circumference relatively much greater than that of said shaft, and a spring coiled about and adapted to embrace the outside of said flange with its free end anchored to said plate for preventing reverse rotation of said shaft although permitting rotation in a taking up direction.

3. In a roll-film camera having an enclosing casing with a top wall, a take-up device including a button external to said wall and an extension rigid therewith and extending through said wall and adapted to engage a take-up spool of film, means for supporting said spool in the camera, a photographic shutter, means for resetting said shutter, an operating connection between said shutter-resetting means and said take-up device additional to said button for operating said take-up device in a taking up direction upon the resetting of said shutter, a disc with an annular depending flange mounted on said take-up device and revoluble therewith, said operating connection having a motion-transmitting member engageable with and adapted to operate said take-up device in a taking up direction upon the resetting of said shutter, and a unidirectional clutch comprising a spring coiled about and embracing the outside of said flange and with one end anchored within said casing for preventing rotation of said shaft in an unwinding direction although permitting rotation in a taking up direction by said shutter-resetting means.

4. In a roll-film camera having an enclosing casing with a top wall, a take-up device including a button external to said top wall and an extension rigid therewith and extending through said top wall and adapted to engage a take-up spool of film, means for supporting said spool in the camera, a photographic shutter, means for resetting said shutter, an operating connection between said shutter resetting means and said take-up device additional to said button for operating said take-up device in a taking up direction upon the resetting of said shutter, a disc with an annular depending flange rigidly mounted on said take-up shaft and revoluble therewith, a cam mounted upon said shaft for frictional movement therewith and relative movement independently thereof, said cam being held between said top wall of the camera and said disc, said operating connection having a motion transmitting member engageable with and adapted to operate said cam and hence said take-up shaft in a taking up direction upon the resetting of said shutter, and a unidirectional clutch comprising a spring coiled about and embracing the outside of said flange and with one end anchored within said casing for preventing the rotation of said shaft in unwinding direction although permitting rotation in a taking up direction by a shutter resetting means.

5. In a roll-holding camera, means for supporting a delivery roll, means for supporting a take-up roll, revoluble means for winding said take-up roll so that a strip of material supported by said delivery roll and engaging said take-up roll is wound from said delivery roll to and upon said take-up roll, a single pivoted take-up control finger or plate engaging said strip between said rolls, resilient means urging said finger against said strip, said finger having a stop formation integral therewith, a stop formation movable with said revoluble means, said formations being so disposed that when said finger is freed from the holding influence of the strip as it is substantially wound upon the take-up member it moves its stop into engagement with said stop revoluble with said taking up means thereby preventing further rotation of said winding means.

6. In a roll-holding camera, means for supporting a delivery roll, means for supporting a take-up roll, revoluble means for winding said take-up roll so that a strip of material supported by said delivery roll and engaging said take-up roll is wound from said delivery roll to and upon said take-up roll, a single unitary operable member having one formation integral therewith which engages said strip between said rolls and another formation also integral therewith for blocking said revoluble means, a spring urging said unitary member toward said strip whereby said engaging formation bears thereupon, a stop formation movable with said revoluble means, said blocking and stop formations being so disposed that when said unitary member is freed from the holding influence of the strip as the strip is substantially wound upon said take-up member and moves toward said revoluble means said member brings said blocking formation into position to be engaged by said stop formation revoluble with said taking up means, such engagement preventing further rotation of said take-up roll.

7. In a roll-holding camera, a front enclosing casing and a rear enclosing casing adapted to be assembled therewith, means upon said front casing for supporting a film, means upon said front casing for taking up a film, stop member upon said front casing for blocking the revolution of said taking up means when the film has been substantially taken up, blocking means for operating said stop member mounted upon said rear member, said blocking means including instrumentalities which after said front and rear casings have been assembled with a film in place in said front casing engage the film as it is being taken up and is operatively connectible to said taking up means for blocking said taking up means after the film has been substantially taken up.

8. In a roll-holding camera, means for supporting a delivery roll, means for supporting a take-up roll, revoluble means for winding said take-up roll so that a strip of material supported by said delivery roll and engaging said take-up roll is wound from said delivery roll to and upon said take-up roll, a pivoted finger having a portion directly engaging said strip between said rolls, resilient means urging said finger against said strip, and a ratchet with a tooth movable with said revoluble means, said finger also having integral therewith a control tooth, said teeth being so disposed that when said finger is freed from the holding influence of the strip as it is substantially wound upon the take-up member it moves said teeth into contact thereby preventing further rotation of said winding means.

9. In a roll-holding camera, means for supporting a delivery roll, means for supporting a take-up roll, revoluble means for winding said take-up roll so that a strip of material supported by said delivery roll and engaging said take-up roll is wound from said delivery roll to and upon said take-up roll, a multi-purposed unitary pivoted finger with one formation integral therewith engaging said strip between said rolls, resilient means urging said finger toward said strip, a ratchet movable with said revoluble means, a toothed dog formation likewise integral with said finger and movable under the influence of said resilient means toward said ratchet, said ratchet and said toothed formation being so disposed that when said finger is freed from the holding influence of said strip as it is substantially wound upon said take-up member said finger moves said dog into position to be engaged by a tooth of said ratchet as said revoluble means is further revolved, such engagement preventing further rotation thereof, an annular flange integral and rotatable with said ratchet, and a wire spring coiled about said flange with its free end anchored to a fixed point of the camera, said spring preventing reverse rotation of said take-up means and hence premature and unwanted stopping of such winding operations.

10. In a roll-holding camera, a front enclosing casing and a rear enclosing casing separable therefrom, means for supporting a delivery roll, means for supporting a take-up roll, revoluble means for winding said take-up roll so that a strip of material supported by said delivery roll and engaging said take-up roll is wound from said delivery roll to and upon said take-up roll, a stop formation mounted for movement with said revoluble means, all of said means being mounted upon said front casing, and means for blocking the rotation of said winding means when the film has been substantially wound upon said take-up member, said means being mounted upon said rear casing and including a finger, a spring for urging said finger forwardly, a toothed member, and a stop, all of said parts of said blocking means being operatively interconnected and jointly movable, said finger and said toothed member being so disposed that when said rear casing is assembled with said front casing said finger engages the film under the influence of said spring and said toothed member after the exhaustion of the film has caused said finger to move forwardly is positioned in line with said stop formation revoluble with said winding means, and said stop being so disposed that when said rear casing is removed from said front casing it engages a fixed portion of said rear casing thereby limiting movement of said blocking means under the influence of said spring.

11. In a camera, an outer enclosing casing, a resilient strip, said strip being supported by said casing therewithin and having a free end, said end being fashioned into separate formations integral therewith one of which supports one end of a roll of film which has been placed in engagement therewith and another of which exerts braking pressure thereupon, means for supporting the opposite end of said roll, and means operable from without said casing for winding up said roll.

12. In a camera, an outer enclosing casing, said casing having a horizontal top wall and a horizontal bottom wall and vertical side walls joining said horizontal walls, an inner support, said inner support being substantially in the form of a frustum of a pyramid with its larger base arcuate and having surfaces forming a central exposure aperture, said surfaces being adapted to engage and support a film, means for fixedly mounting said support entirely within said casing with said bases vertically disposed and said larger base disposed rearwardly adjacent the rear of said casing and the smaller base forwardly and with said frustum spaced from all of the walls of said casing, a photographic lens mounted in said smaller base opposite said exposure aperture, a horizontal resilient strip adapted to engage one end of a delivery spool of film and one end of a take-up spool of film mounted upon one of the horizontal walls intermediate said bases of said support and parallel to and relatively adjacent one of said horizontal walls of said casing when said support is disposed within said casing, each end of said strip spanning said exposure aperture therebelow and projecting beyond the body of said frustum into the space between a vertical wall thereof and the side vertical wall of said casing adjacent thereto and including instrumentalities adjacent said frustum adapted to engage one end of a spool of film, means carried by said frustum and projecting therefrom adapted to engage and hold the other end of each of said spools, whereby a film may be threaded from one of said spools so supported along said surface of said arcuate base over said aperture and to the other said spools, the angle of the portion of said film between said spools and the vertical edges of said surface relatively adjacent said spools being such as to tend to hold said film in engagement with said surface, and means accessible from the exterior of said casing and having a portion adapted to engage and revolve one of said spools for moving the film along said surface and over said aperture.

13. In a camera, an outer enclosing casing, a resilient strip supported by said casing therewithin, an end of said strip being formed into a supporting and retarding cup integral therewith which embodies formations integral therewith which both support and exert a braking pressure upon one end of a roll of film in engagement therewith, means for supporting the opposite end of said roll, and means operable from without said casing for revolving said roll.

14. In a camera, an outer enclosing casing, a centering and friction-applying cup, said cup being formed with an opening to receive one end of a spindle of a spool of film and with an edge formation as disposed and dimensioned in relation to said opening and to the diameter of a side of said spool that it continuously bears upon said side to exert a braking or frictional pressure thereupon both while said roll is motionless and also while it is being revolved, means for resiliently supporting said cup within said casing, means for supporting the end of said spindle opposite that which is supported by said cup, and means operable from without said casing for revolving said spindle to wind a film thereupon.

15. In a camera having an outer enclosing casing, a resilient strip supported upon said casing therewithin, each outer edge of said strip being offset from the adjacent central portion and parallel thereto with an opening in each of said offset portions for the reception of a spindle of a spool of film, means for supporting the opposite ends of said spool, and means operable from without said enclosing casing for revolving said spool, one surface of each of said offset portions being formed and disposed to support said spool after it has been placed thereupon; in combination, formations in another surface of each of said offset portions of said strip created by the distortion of each of said offset portions to bear upon the side of said spool to subject it to a continuous braking pressure, said two surfaces being integral with each of said offset portions respectively.

16. In a camera, an outer enclosing casing, a resilient strip supported upon said casing therewithin, an opening in an outer portion of said strip for the reception of a spindle of a spool of film, a portion of said strip adjacent said opening being bent away from the main portion into a combined braking and supporting formation which both bears upon the side of said spool and supports it, whereby said spool is subjected to retarding friction and also supported, means for supporting the opposite end of said spool, and means operable from the outside of said casing for winding said spool.

17. In a camera, an outer enclosing casing, a resilient strip supported by said casing therewithin, an end of said strip being formed into a cup integral therewith, a shoulder formed in one side of said cup integral therewith, the configuration of said cup being such that said shoulder formed in said side engages a flange of a spool placed therewithin at a height above the bottom surface of the spool so that said bottom surface and said flange clear each other, thereby supporting said spool and keeping it under constant resilient retardation, means for supporting the opposite end of said spool, and means operable from without said casing for revolving said spool.

18. In a camera having an outer enclosing casing, a resilient strip supported by said casing therewithin, said strip being adapted to support at least one spool of film, one end of said strip being formed into a cup integral therewith and circular in horizontal cross sestion, said cup having bottom and side walls, said bottom wall being substantially parallel to the main body of said strip and said side wall being inclined upwardly therefrom at an obtuse angle, the dimensions of said cup being such that a horizontal section through said angular side wall upwardly from said bottom wall is of substantially the same diameter as that of the lower flange of said spool whereby said flange when the spool is in position in said cup is supported by said side wall and spaced above said bottom wall, means for supporting the opposite end of said spool, and means operable from without said casing for revolving said spool.

19. In a roll-holding camera, a front enclosing casing and a rear enclosing casing separable therefrom, means for supporting a delivery roll, means for supporting a take-up roll, revoluble mechanism for winding said take-up roll so that a strip of material supported by said delivery roll and engaging said take-up roll is wound from said delivery roll to and upon said take-up roll; means for stopping the revolution of said take-up roll when said film is exhausted by having been completely wound from said delivery roll to said take-up roll; said stopping means including blocking instrumentalities mounted upon said front casing and engaging said revoluble mechanism and instrumentalities mounted upon said rear casing for engaging the film when said casings are joined, said instrumentalities being so mounted that when said rear casing is positioned upon said front casing they are engageable with and operate said blocking instrumentalities mounted upon said front casing and operate said stopping means upon the exhaustion of the film.

20. In a roll-holding camera, a front enclosing casing and a rear enclosing casing separable therefrom, means for supporting a delivery roll, means for supporting a take-up roll, revoluble mechanism for winding said take-up roll so that a strip of material supported by said delivery roll and engaging said take-up roll is wound from said delivery roll to and upon said take-up roll; means for stopping the revolution of said take-up roll when said film is exhaused by having been completely wound from said delivery roll to said take-up roll; said stopping means including blocking instrumentalities mounted upon said front casing and engaging said revoluble mechanism and instrumentalities mounted upon said rear enclosing casing for engaging the film when said casings are joined, said instrumentalities being so mounted that when said rear casing is joined to said front casing they are engageable with and operate said instrumentalities mounted upon said front casing and operate said stopping means upon the exhaustion of the film, and means mounted upon said front casing engaging the film for holding it taut until said casings are joined and said instrumentalities are operable upon said take-up roll.

21. In a camera, an outer enclosing casing with a top wall and a bottom wall and side walls joining said top and bottom walls, an inner support adapted to be mounted within said outer casing, said support when so mounted being spaced from said top and bottom and side walls of said casing and having a lens mounted in the front thereof and surfaces bounding an exposure aperture opposite said lens at the back thereof, means for fixedly mounting said inner support within said casing, a strip adapted to engage a top portion of a delivery spool and of a take-up spool mounted upon the top of said support so that when said support is mounted within said casing it is parallel to and relatively adjacent said top wall, a strip adapted to engage the bottom portion of each of said spools being mounted upon the bottom of said inner support parallel to the inner side of said bottom wall when said support is so mounted, said delivery spool when so mounted being adjacent one side of said exposure aperture and said take-up spool being adjacent the other side of said aperture and the film passing thereover in line with said lens, said strips then spanning the area of said aperture thereabove and therebelow respectively and the ends of said strips projecting laterally beyond said inner support and into the space between said strips and the distance between said strips being substantially equal to the height of a film spool, at least one of said strips having a portion which is formed into a cup with a conical out-flaring side extending from the bottom of said cup for the reception of a flange of one of said spools, said cup being so dimensioned that said flange bears upon the upstanding conical side of said cup thereby subjecting said spool to a resilient braking pressure as well as supporting it above the bottom of the cup, and means for revolving said take-up spool for moving the film thereto from said delivery spool under the influence of said braking pressure.

22. In a roll-holding camera, a front enclosing casing and a rear enclosing casing separable therefrom, two parallel horizontal strips spaced apart a distance substantially equal to the vertical dimension of a film roll, one of said strips being resilient and both of said strips at the ends thereof having formations engaging ends of said rolls, a support for said strips upon said front casing, revoluble means for winding said take-up roll so that a strip of material supported by said delivery roll and engaging said take-up roll is wound from said delivery roll to and upon said take-up roll, a stop formation mounted for movement with said revoluable means, all of said means being mounted upon said front casing, and means for blocking the rotation of said winding means when the film has been substantially wound upon said take-up member, said means being mounted upon said rear casing and including a finger, a spring for urging said finger forwardly, a toothed member, and a stop, all of said parts of said blocking means being operatively interconnected and jointly movable, said finger and said toothed member being so disposed that when said rear casing is assembled with said front casing said finger engages the film under the influence of said spring and said toothed member after the exhaustion of the film has caused said finger to move forwardly is positioned in line with said stop formation revoluble with said winding means, said stop being so disposed that when said rear casing is removed from said front casing it engages a fixed portion of said rear casing thereby limiting movement of said blocking means under the influence of said spring, said strips holding said rolls in position in said front casing irrespective of whether said rear casing is attached thereto or not.

23. In a roll-holding camera, a mount for a delivery roll of a film, a mount spaced therefrom for a take-up roll, the film between said rolls passing over an exposure aperture, a member for winding the take-up roll, mechanism for blocking the operation of said take-up member when all of film has been wound from said delivery roll to and about said take-up roll, said mechanism including two stop members one of which is revoluble with said take-up member and another of which is movable into stopping relation therewith, a member having one formation integral therewith which acts as a feeler member engaging the film between said rolls, a spring for pressing said feeler member against the stretch of film between said rolls, said feeler member also having another formation integral therewith which acts as one of said previously recited stop members whereby said stop members are brought into stopping relation with each other when by the exhaustion of the film the tension thereupon is removed and said spring operates, and a brake associated with said roll supports for maintaining the film under tension between said rolls until all of it is wound upon said take-up whereby prior to that time said feeler member is prevented from premature operation.

24. In a camera, a front casing, a rear casing separable therefrom, means to lock said casings together, said front and back casings being open until locked together, an inner support with opposite openings and adapted for mounting within said front casing and when so mounted being spaced from the inner surfaces of walls thereof, said front casing having an exposure opening aligned with openings in said inner support, a photographic shutter, mechanism for operating and re-setting said shutter, said mechanism including a shutter lever pivoted upon the top of said support for horizontal movement, one end of said lever being adapted to operate said mechanism to make an exposure and the other end to be operated to reset said mechanism thereafter, a photographic lens aligned with said openings, means for moving said lens to focus the camera, a common mounting for said lens moving means and said shutter, a masking plate rotatable upon said common mounting, a finder lens, said rotatable masking plate having a plurality of finder openings so disposed that the rotation thereof successively brings opposite said finder lens a opening which limits the field of said finder lens in accordance with the current setting of said photographic lens, said masking plate projecting beyond the adjacent portion of the body of the camera, indicia for the setting of the photographic lens on the rearward side of said masking plate, a spool supporting strip on the top of said support and extending therebeyond at each side a spool supporting strip upon the bottom of said support parallel to said first mentioned strip and extending beyond each side of said support, holding means for a film spool at the respective extremities of each strip, the film passing between said spools over said opening formed in the larger base of said support, a take-up button, a revoluble take-up shaft connectible with said shutter lever upon its rotation in a taking up direction for moving said lever in one direction for operating said mechanism for resetting it, a stop formation and an annular flange attached to and revoluble with said shaft, an exposure button disposed upon the exterior of said front casing and engageable with said shutter control lever to move it opposite to that in which said lever is moved by the rotation of said take-up to open said shutter, means for mounting said support within said casing, a finger mounted upon said rear casing adjacent the forward portion thereof, a toothed member connected with said finger, a spring for urging said finger forwardly into engagement with the film when said rear casing is locked upon said front casing and said toothed member being aligned with said stop formation attached to said take-up shaft whereby when said film is completely wound upon said take-up spool said spring moves said toothed blocking member into engagement with stop formation thereby preventing further rotation of said take-up button and further resetting of said shutter, and a stop formation upon said rear casing for limiting the forward movement of said finger and said toothed blocking member when said rear casing is separated from said front casing.

References Cited in the file of this patent
UNITED STATES PATENTS

| | | |
|---|---|---|
| 1,156,441 | Stearns | Oct. 12, 1915 |
| 1,158,025 | Bowen | Oct. 26, 1915 |
| 1,183,215 | Macdonald | May 16, 1916 |
| 1,191,066 | Cramer | July 11, 1916 |
| 1,367,268 | Kessler | Feb. 1, 1921 |
| 1,493,334 | Fielding | May 6, 1924 |
| 1,504,977 | Robertson et al. | Aug. 12, 1924 |
| 1,511,158 | Bornmann | Oct. 7, 1924 |
| 1,535,930 | MacDonald | Apr. 28, 1925 |
| 1,579,865 | Hubbell | Apr. 6, 1926 |
| 1,591,697 | Bornmann | July 6, 1926 |
| 1,645,894 | Christie | Oct. 18, 1927 |
| 1,725,460 | Lessler et al. | Aug. 20, 1929 |
| 1,883,511 | Bornmann | Oct. 18, 1932 |
| 1,965,359 | Skolfield | July 3, 1934 |
| 1,967,061 | Muros | July 17, 1934 |
| 1,973,479 | Green et al. | Sept. 11, 1934 |
| 2,035,657 | Kottemann | Mar. 31, 1936 |
| 2,132,680 | Crumrine | Oct. 11, 1938 |
| 2,201,097 | Kingston | May 14, 1940 |
| 2,204,518 | Tait | June 11, 1940 |
| 2,206,532 | Galter | July 2, 1940 |
| 2,213,492 | Galter | Sept. 3, 1940 |
| 2,238,491 | Hutchison | Apr. 15, 1941 |
| 2,253,090 | Peterson | Aug. 19, 1941 |
| 2,282,850 | Brownscombe | May 12, 1942 |
| 2,286,808 | Hutchison | June 16, 1942 |
| 2,324,086 | Hutchison | July 13, 1943 |
| 2,357,327 | Harris et al. | Sept. 5, 1944 |
| 2,387,758 | Jaros | Oct. 30, 1945 |
| 2,455,232 | Comer | Nov. 30, 1948 |